(12) United States Patent
Kalenian

(10) Patent No.: US 7,419,692 B1
(45) Date of Patent: Sep. 2, 2008

(54) METHODS AND SYSTEMS FOR FORMING CONCENTRATED CONSUMABLE EXTRACTS

(75) Inventor: Paul A. Kalenian, Princeton, MA (US)

(73) Assignee: XCafe, LLC, Princeton, MA (US)

( * ) Notice: Subject to any disclaimer, the term of this patent is extended or adjusted under 35 U.S.C. 154(b) by 0 days.

(21) Appl. No.: 10/111,791

(22) PCT Filed: Oct. 27, 2000

(86) PCT No.: PCT/US00/29651

§ 371 (c)(1),
(2), (4) Date: Oct. 16, 2002

(87) PCT Pub. No.: WO01/30173

PCT Pub. Date: May 3, 2001

Related U.S. Application Data

(60) Provisional application No. 60/161,981, filed on Oct. 28, 1999.

(51) Int. Cl.
*A23L 1/28* (2006.01)
(52) U.S. Cl. ....................... 426/433; 426/594
(58) Field of Classification Search ................ 426/433, 426/594
See application file for complete search history.

(56) References Cited

U.S. PATENT DOCUMENTS

| | | | |
|---|---|---|---|
| 1,478,908 A * | 12/1923 | Oldham | ............... 426/433 |
| 2,620,276 A | 12/1952 | Heyman | |
| 2,887,038 A * | 5/1959 | Rosander | ................ 99/307 |
| 3,228,876 A | 1/1966 | Mahon | |
| 3,261,507 A | 7/1966 | Cornelius | |
| 3,349,691 A | 10/1967 | Austin et al. | |
| 3,458,320 A | 7/1969 | Niven | |
| 3,484,245 A * | 12/1969 | Goto | ............... 426/397 |
| 3,582,351 A | 6/1971 | Austin et al. | |

(Continued)

FOREIGN PATENT DOCUMENTS

CA   1157310   11/1983

(Continued)

OTHER PUBLICATIONS

Schauwecker, "Nanofiltration of apple juice", *Flussiges Obst*, 1994, pp. 259-262., vol. 61, No. 9, Unipektin AG., Zurich, Switzerland. (Abstract only).

(Continued)

*Primary Examiner*—Anthony Weier
(74) *Attorney, Agent, or Firm*—Wolf, Greenfield & Sacks, P.C.

(57) ABSTRACT

Typical known methods for producing large quantities of concentrated extracts from solid raw materials such as ground, roasted coffee are not ideally suited to producing high quality coffee extracts that are rich in flavor and fragrance, and which maintain the varietal characteristics of the roasted coffee from which they are produced. The current invention provides filtration methods for producing such high quality concentrated extracts from more dilute extracts via solvent removal. The invention provides methods that have sufficient flexibility and scalability to be used for a wide variety of applications, including for producing industrial-scale quantities of extracts for the food and beverage industry. The invention provides methods and apparatus that can produce highly concentrated, "gourmet quality" extracts for use as flavoring agents, beverage concentrates, and fragrances.

31 Claims, 8 Drawing Sheets

U.S. PATENT DOCUMENTS

| | | | |
|---|---|---|---|
| 3,607,280 A | | 9/1971 | Durchholz |
| 3,682,649 A | * | 8/1972 | Orozovich .................. 426/390 |
| 3,700,466 A | * | 10/1972 | Bergeron et al. ............ 426/594 |
| 3,762,930 A | | 10/1973 | Mahlmann |
| 3,769,033 A | * | 10/1973 | Panzer et al. ................ 426/428 |
| 3,788,860 A | * | 1/1974 | Mahlmann .................. 426/433 |
| 3,790,689 A | | 2/1974 | Pichon et al. |
| 3,800,055 A | * | 3/1974 | Gallagher .................... 426/432 |
| 3,830,940 A | | 8/1974 | Sivetz |
| 3,843,824 A | * | 10/1974 | Roselius ..................... 426/386 |
| 3,908,033 A | * | 9/1975 | Ganiaris ..................... 426/427 |
| 3,995,067 A | | 11/1976 | Marsh et al. |
| 4,156,031 A | * | 5/1979 | Hamell et al. ............... 426/541 |
| 4,158,329 A | | 6/1979 | McKnight |
| 4,189,991 A | | 2/1980 | Haddad |
| 4,226,891 A | * | 10/1980 | Lewis .......................... 426/430 |
| 4,276,315 A | * | 6/1981 | Katz et al. .................. 426/428 |
| 4,277,509 A | | 7/1981 | Wouda |
| 4,310,468 A | * | 1/1982 | Reiners ........................ 554/15 |
| 4,352,829 A | * | 10/1982 | Noyes et al. ................. 426/387 |
| 4,414,113 A | | 11/1983 | Laterra |
| 4,505,191 A | | 3/1985 | Longo |
| 4,534,985 A | | 8/1985 | Gasau |
| 4,579,048 A | * | 4/1986 | Stover .......................... 99/280 |
| 4,633,771 A | | 1/1987 | Anderl |
| 4,721,035 A | | 1/1988 | Chang-Diaz |
| 4,882,982 A | | 11/1989 | Muttoni |
| 4,929,462 A | * | 5/1990 | Moorman et al. ........... 426/478 |
| 4,998,462 A | | 3/1991 | Sekiguchi |
| 5,041,245 A | | 8/1991 | Benado |
| 5,043,178 A | | 8/1991 | Gottesman et al. |
| 5,114,728 A | * | 5/1992 | Ben-Nasr et al. ............ 426/427 |
| 5,114,731 A | | 5/1992 | Belville et al. |
| 5,127,318 A | | 7/1992 | Selby, III |
| 5,168,794 A | | 12/1992 | Glucksmann |
| 5,204,136 A | | 4/1993 | Hellemons |
| 5,230,278 A | | 7/1993 | Bunn et al. |
| 5,242,700 A | | 9/1993 | Schlecht |
| 5,255,593 A | | 10/1993 | Bunn et al. |
| 5,267,506 A | | 12/1993 | Cai |
| 5,297,472 A | | 3/1994 | Suzuki et al. |
| 5,301,694 A | * | 4/1994 | Raymond et al. ........... 131/297 |
| 5,303,639 A | | 4/1994 | Bunn et al. |
| 5,337,652 A | | 8/1994 | Fischer et al. |
| 5,372,832 A | | 12/1994 | Bunn et al. |
| 5,393,540 A | | 2/1995 | Bunn et al. |
| 5,473,973 A | | 12/1995 | Cortese |
| 5,497,792 A | | 3/1996 | Prasad et al. |
| 5,525,746 A | | 6/1996 | Franke |
| 5,637,343 A | * | 6/1997 | Ryan, Jr. ..................... 426/594 |
| 5,638,740 A | | 6/1997 | Cai |
| 5,699,719 A | | 12/1997 | Lucas et al. |
| 5,704,950 A | | 1/1998 | Putatunda |
| 5,707,673 A | | 1/1998 | Prevost et al. |
| 5,739,364 A | | 4/1998 | Franke |
| 5,778,765 A | * | 7/1998 | Klawuhn et al. .............. 99/290 |
| 5,901,636 A | * | 5/1999 | Witziers et al. ............... 99/283 |
| 6,102,213 A | * | 8/2000 | Gurol .......................... 210/506 |
| 6,203,837 B1 | | 3/2001 | Kalenian |
| 6,548,094 B2 | | 4/2003 | Kalenian |
| 6,887,506 B2 | | 5/2005 | Kalenian |
| 2003/0118707 A1 | | 6/2003 | Kalenian |
| 2005/0112253 A1 | | 5/2005 | Kalenian |

FOREIGN PATENT DOCUMENTS

| | | |
|---|---|---|
| CA | 2087242 | 7/1993 |
| CN | 1071810 A | 5/1993 |
| DE | 33 18317 A1 | 11/1984 |
| DE | 197 06 005 A1 | 8/1998 |
| EP | 0 256 567 A2 | 2/1988 |
| EP | 0 412 496 A2 | 2/1991 |
| EP | 0 812 558 A1 | 12/1997 |
| EP | 1 787 523 | 5/2007 |
| EP | 1 787 523 A2 | 5/2007 |
| GB | 691 845 | 5/1953 |
| GB | 691 845 A | 5/1953 |
| JP | 02138938 * | 5/1990 |
| JP | 4-45747 * | 2/1992 |
| NL | 6 803 767 A | 5/1968 |
| WO | WO 00/19833 A2 | 4/2000 |

OTHER PUBLICATIONS

Sheu et al., "Preconcentration of apple juice by reverse osmosis", *Journal of Food Science*, Mar. 1983, pp. 422-429, vol. 48, No. 2, Institute of Food Technologists, Chicago, US.

Abstract: JP 02138938, S. Mizuki, May 28, 1990.

Abstract from Patent Abstracts of Japan for: JP 02138938 to Mizuki, et al. May 28, 1990.

European Patent Office Communication issued Nov. 24, 2004 for a corresponding European patent application, serial No. 00 973 946.7-1221.

English language translation of Japanese Patent Application Publication JP H02-138938 to Mizuki, et al., published May 28, 1990.

First Office Action of The State Intellectual Property Office of The People's Republic of China issued Dec. 24, 2004 for a corresponding Chinese patent application, serial No. 00 815 007.9.

Partial European Search Report, Issued Mar. 16, 2006, for Commonly-owned European Patent Application No. 055027713.6, and claims as pending in Commonly-owned European Patent Application No. 055027713.6 as of Mar. 16, 2006.

European Patent Office Communication issued Dec. 23, 2003 for a corresponding European patent application, serial No. 00 973 946.7-1221.

European Patent Office Search Report, Application No. EP 07 10 3637, Sep. 12, 2007.

Canadian Office Action dated Jan. 10, 2008 for corresponding Canadian Patent Application No. 2,388,596 and claims as pending as of Jan. 10, 2008.

European Patent Office Search Report, Application No. EP 07 10 3637, Sep. 12, 2007.

* cited by examiner ns and Systems for Forming
METHODS AND SYSTEMS FOR FORMING CONCENTRATED CONSUMABLE EXTRACTS

RELATED APPLICATIONS

This application is a national stage filing under 35 U.S.C. §371 of International Application No. PCT/US00/29651 filed 27 Oct. 2000, which was published under PCT Article 21(2) in English. This International application claims the benefit under 35 U.S.C. §119(e) of U.S. Provisional Application Ser. No. 60/161,981, filed Oct. 28, 1999.

FIELD OF THE INVENTION

The present invention relates to methods and systems for producing a consumable aqueous extract from a solid raw material, and, more specifically, to methods and systems for concentrating such consumable extracts through the use of filtration. Specific embodiments of the invention involve methods for forming concentrated aqueous extracts of roasted coffee useful in food, fragrance, and beverage products.

BACKGROUND OF THE INVENTION

A variety of solid raw materials are commonly extracted with aqueous solvents, such as hot water, to form consumable aqueous extracts for use in foods, fragrances, or beverages. Common materials include roasted ground coffee, tea, and cocoa just to name a few. Typical and representative of currently employed methods and systems for performing such extractions are those used for brewing and extracting roasted coffee. Generally the prior art systems fall into two broad categories: small-scale home or commercial brewing equipment for producing beverages; and large-scale industrial extractors for producing concentrated extracts for use as flavorings or as raw materials for the production of instant coffee products. When used for the production of instant coffee products, the aqueous solvent is typically removed from the dissolved coffee solids by processes such as freeze drying or spray drying.

Typical prior art large-scale coffee extractors and associated extraction methods, especially when used to produce coffee extracts for the subsequent production of instant coffee, are designed to exhaustively extract a given quantity of ground roasted coffee and hydrolyze the cellulose of the roasted coffee. This is done for economic reasons: the more soluble coffee solids extracted from a given quantity of roasted coffee raw material, the greater the quantity of final instant coffee product derived upon removal of the water by drying. To this end, typical prior art large-scale coffee extractors are designed for the exhaustive extraction and hydrolysis of typically low-grade ground coffee and not for production of a high quality, flavorful, fragrant extract or for the production of various grades of extract from a given quantity of ground, roasted coffee. Many typical prior art extractor systems of this type employ one or more columns having fixed beds of ground roasted coffee. Representative of such a system is the one described in U.S. Pat. No. 3,830,940 to Sivetz. While such systems and methods are useful for exhaustive extraction with hydrolysis, they are not ideally suited for producing high quality coffee extracts with desirable sweetness and flavor characteristics or for production of various grades of extracts from a given choice of ground, roasted coffee. The relatively long extraction times (for example greater than 1 hour), high water temperatures, and levels of dilution used in certain prior art extraction processes can result in extracts having poor flavor or fragrance characteristics, which are often passed on to the dried instant coffee products produced from such extracts. Furthermore, the process of de-watering the extracts by typical prior art methods, such as spray drying or freeze drying, in forming the instant coffee products can result in the loss or degradation of desirable varietal flavor and fragrance components of the ground, roasted coffee. Many of the concentrated coffee extracts commonly employed as flavor components in the food industry (e.g. as flavorings for coffee ice cream, iced coffee beverages, and coffee syrups) are produced by reconstituting such poor quality instant coffee products with water or other materials.

It is understood that sweeter and more flavorful coffee extract can be produced near the beginning of an extraction cycle, when the fresh ground coffee has been in contact for a relatively short period of time with only a relatively small quantity of water, than can be produced later in the extraction process after the coffee has been exposed to additional quantities of water and more exhaustive extraction. Attempts have been made to improve upon the quality and flavor of coffee extracts and instant coffee products produced by large scale extraction processes. One such method described in U.S. Pat. No. 4,534,985 to Gasau ('985) discloses an industrial scale continuous extraction process and apparatus for the extraction of coffee or tea. The apparatus involves a complex system using a number of extractant beds and extraction zones, where the beds are movable between zones by rotation of the apparatus. The process reduces the total time of the extraction process when compared to more conventional prior art extraction methods. The '985 patent also discloses the use of compressed air or an inert gas in a "recovery station" of the apparatus to maximize recovery of the residual liquid present in the spent grounds after extraction.

Various smaller scale brewing/extraction methods for home or commercial use are known in the prior art for producing beverages from solid raw materials such as coffee, tea and cocoa. Common methods include steeping or infusion in a static volume of hot water (i.e. steeping a tea bag in a cup of hot water), steam-driven percolation, and extraction via a continuous flow of hot water under the force of gravity through a bed of solid extractable material, typically coffee. The latter method described is the one typically employed in home "drip method" coffee makers. All of these methods typically produce a relatively dilute beverage-strength extract (typically, 1 lb of ground, roasted coffee will yield about 320 oz. of beverage-strength extract). In addition, because of the continuous addition of water used to drive the flow of extract through the bed, the beverages produced can contain flavor and/or fragrance undesirable quantities of certain bitter components, which may be undesirable for certain applications. Also, because these prior art methods brew in the presence of oxygen, the flavor and fragrance of the resulting extract can be degraded by undesirable oxidation.

An improvement to most of the above described methods for applications where it is desired to produce a more concentrated coffee beverage having a sweeter flavor and fragrance, is the espresso method of coffee extraction. The espresso method of extraction typically employs a small-scale home or commercial brewing apparatus utilizing a less exhaustive extraction method to produce a relatively sweet, more concentrated beverage. Typically, a higher ratio of ground coffee to hot water is employed, for example about 1 lb. of ground roasted coffee may typically yield about 64-128 oz of coffee beverage. In order to allow sufficient contact time between water and the ground coffee, the method typically utilizes a finely ground coffee (e.g. 14 gram weight) with hot water being forced through the bed of grounds contained in the brew chamber by additional pressurized hot water. Most typical currently employed espresso type extraction devices are capable of producing only relatively small quantities of extract during each extraction cycle. In addition the quality of the beverage can be very dependant on the grind and packing of the coffee, which dictates the back pressure developed by the flowing water during the extraction, and the extraction time for a given total volume of beverage. A lack of control over these variables can lead to a poor or inconsistent quality of extract. Also, since hot water is typically used to force extract from the bed of ground coffee during the entire extraction process, a level of extraction that is undesirable for certain applications may still occur, yielding an extract which may be too dilute for certain applications, and may not be ideally suited for use as a food or flavor additive.

A variety of small-scale espresso style coffee brewers have been described which attempt to improve upon the performance of conventional espresso brewers. U.S. Pat. No. 5,127, 318 to Selby ('318) and U.S. Pat. No. 5,473,973 to Cortese ('973) both disclose an apparatus and process for extracting espresso type coffee in which the pressure within the extraction region is regulated by a biased valving arrangement on the outlet line downstream of the coffee bed. The valves are designed to remain closed during the initial pressurization of the extraction chamber by hot water until a preset pressure is reached that can overcome the bias of the regulating valve. When such pressure is reached, the valve opens for flow and maintains a relatively constant pressure in the extraction chamber during the remainder of the extraction process relatively independent of the grind or packing of the coffee. In the disclosed systems, the pressure constantly rises until a predetermined pressure is reached, at which point, flow immediately commences.

U.S. Pat. No. 5,267,506 to Cai ('506) discloses an apparatus for automatically brewing espresso coffee and includes one embodiment where pressurized steam generated by a heating unit is passed through the coffee grounds to purge liquid so that the grounds will not drip when the brew chamber is removed.

U.S. Pat. No. 5,337,652 to Fischer et al. ('652) discloses an espresso machine and method utilizing a biased pressure relief valve down stream of the brewing chamber similar to U.S. Pat. 5,127,318 ('318) and U.S. Pat. No. 5,473,973 ('973) described above. The biased valve prevents flow from leaving the discharge line until the pressure within the chamber rises to a fixed predetermined level; immediately thereafter, the valve opens and maintains a relatively constant pressure within the brew chamber during the remainder of the extraction. The '652 system also includes an air pump with an outlet line in fluid communication with the water heating chamber. The air pump is used at the end of the brewing cycle to pump air through the coffee grounds in order to dry the coffee and produce a foamy head. The air from the pump is directed to the brewing chamber from the hot water compartment via a relatively complex automated valving/switching mechanism on a flow control manifold located within the water heating chamber. The air supplied to the brewing chamber in the '652 system passes through the water heating chamber before entering the brewing chamber thus adding heat and moisture to the gas. While some of the above cited systems and methods for producing consumable extracts from solid raw materials represent, in some cases, useful contributions to the art of producing consumable extracts, there exists a need for improved methods and systems for producing variable quantities, including large volumes, of consumable extracts, including highly concentrated extracts, from solid raw materials, the extracts having a desirable combination of sweetness, flavor, and fragrance characteristics.

SUMMARY OF THE INVENTION

Accordingly, the present invention, in some embodiments, can provide improved methods and apparatuses able to controllably produce highly concentrated or less highly concentrated consumable extracts having excellent and desirable sweetness, flavor, and fragrance qualities from solid raw materials. In other embodiments, methods and apparatuses are provided that utilize filtration methods, such as reverse osmosis and/or nanofiltration, to remove excess solvent from consumable extracts to produce more concentrated extracts with minimal loss of desirable flavor and fragrance characteristics.

In one aspect, a method is described for increasing the concentration of a consumable material in a consumable extract. In one embodiment, the method comprises supplying the extract to the retentate side of a filter and passing at least a portion of the solvent component of the extract through a filtration medium to form a permeate on the permeate side of the filter while retaining at least a portion of the consumable material on the retentate side of the filter, thereby forming a solvent-reduced consumable extract. This solvent-reduced consumable extract is more concentrated in the consumable material and is collected from the retentate side of the filter.

In another embodiment, a method for producing a blended coffee extract is disclosed. The method comprises extracting a quantity of roasted coffee with a quantity of aqueous solvent to form a first-pass coffee extract having a concentration of dissolved coffee solids of a first value. The method further involves extracting the same quantity of roasted coffee previously extracted in the above step with an additional quantity of aqueous solvent to form a second-pass coffee extract having a concentration of dissolved coffee solids therein of a second value that is less than the first value. The method further comprises increasing the concentration of dissolved coffee solids in the second-pass coffee extract by removing a quantity of aqueous solvent from the second-pass extract. The method further includes mixing a quantity of the first-pass extract with a quantity of the second-pass extract, concentrated in the above step, to form a blended extract.

In another aspect, an aqueous coffee extract is disclosed. The extract is obtained by extraction of a quantity of roasted coffee that includes at least one chosen variety of roasted coffee. The extract contains at least about 15% wt. dissolved coffee solids and retains an effective amount of the varietal flavor and fragrance components characterizing the at least one chosen variety of roasted coffee from other varieties of roasted coffee.

Other advantages, novel features, and objects of the invention will become apparent from the following detailed description of the invention when considered in conjunction with the accompanying drawings, which are schematic and which are not intended to be drawn to scale. In the Figures, each identical or similar component that is illustrated in various Figures is represented by a single numeral. For purposes of clarity, not every component is labeled in every Figure.

DETAILED DESCRIPTION OF THE INVENTION

Figure 1:
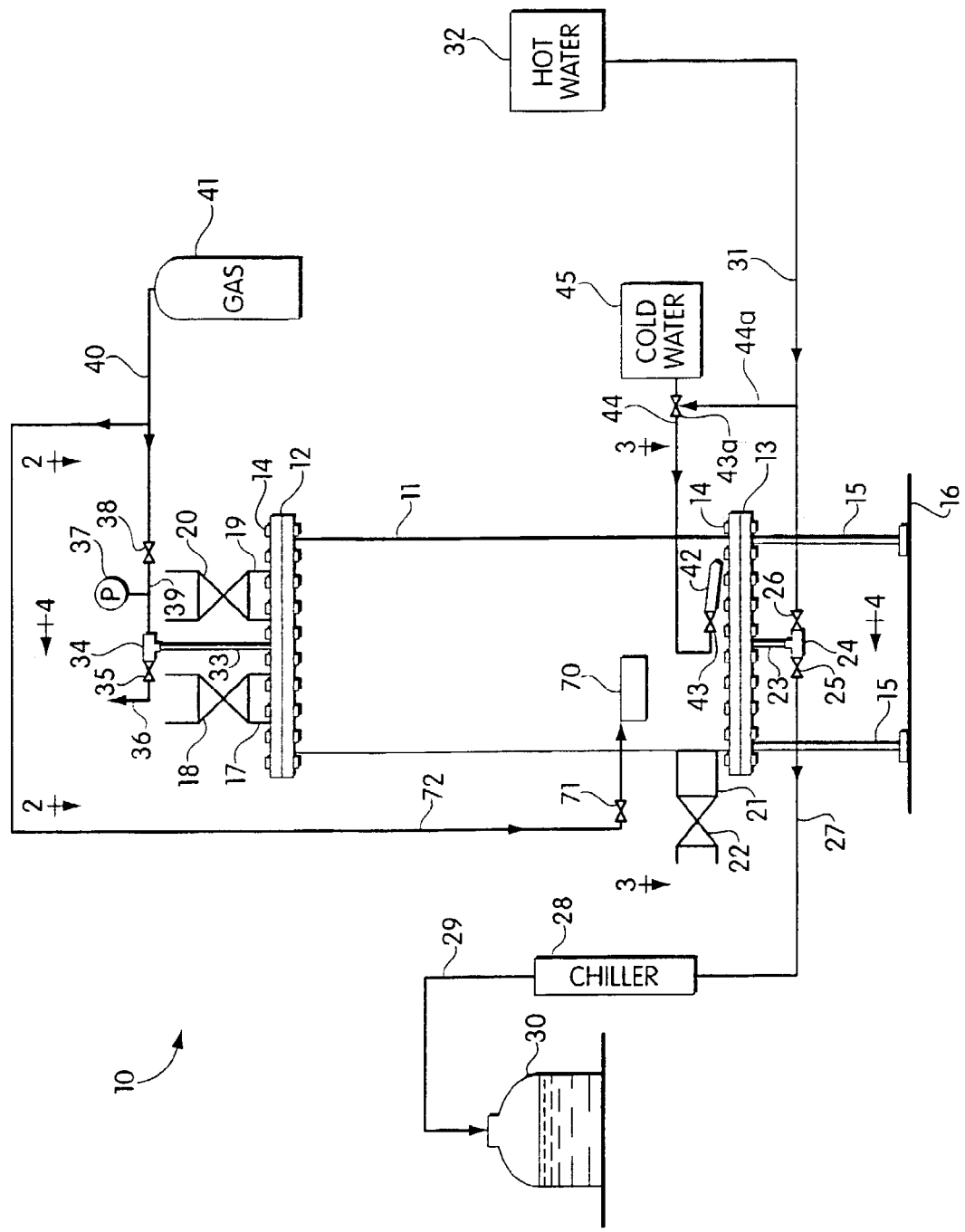
FIG. 1 is a schematic illustration of an apparatus for forming a consumable extract from a solid raw material according to one embodiment of the invention.

The present invention involves methods for forming consumable extracts containing a consumable material from a variety of solid raw materials, which extracts can be of superior quality with regard to flavor and fragrance compared to similar extracts produced according to typical prior art extraction methods. Some embodiments of the invention also involve novel methods for removing excess solvent from consumable extracts to form a more concentrated extract, without substantially degrading the flavor and fragrance characteristics of the extract. The term "consumable extract" as used herein, refers to a solution containing a dissolved or suspended consumable material in a consumable solvent. A "consumable solvent" refers to an essentially non-toxic, ingestible liquid that has the ability to dissolve or suspend a non-zero quantity of the consumable material. "Consumable material" as used herein, refers to an extractable component of a solid raw material that is extracted by, and can be dissolved or suspended in, the consumable solvent. A "solid raw material" as used herein, refers to a solid material including at least one solid component that is insoluble in the consumable solvent and at least one other component that is a consumable material. Preferred consumable solvents for use in the invention are aqueous solvents. An "aqueous solvent" according to the invention comprises water, and may additionally include other components that are soluble or miscible in the water, which components may be useful or desired for particular applications. When an aqueous solvent is employed in the invention, the consumable extracts produced will be aqueous extracts.

The solid raw materials that may be advantageously employed according to the invention can include a variety of organic solids from which consumable materials can be extracted, for example, tea leaves, cocoa, fruit, vanilla beans, and roasted coffee. While it should be understood that the methods and apparatus described herein in accordance with the invention can potentially be used for any suitable solid raw material, including but not limited to those listed above, to exemplify the method for the purpose of the detailed description, specific reference will be made to roasted coffee.

Unlike typical prior art methods and apparatus for producing aqueous extracts from roasted coffee (i.e. coffee extracts), the current invention enables the production of relatively concentrated coffee extracts that exhibit a high level of sweetness and flavor quality and retain the varietal characteristics specific to the particular variety of coffee being extracted. Unlike typical prior art methods for producing concentrated coffee extracts, for example for use in producing instant coffee, the inventive methods, in some embodiments, avoid exhaustive extraction of the roasted coffee with high water temperatures that can lead to hydrolysis (typically above the boiling point of water at atmospheric pressure), which can lead to loss of fragrance and extraction of an undesirable quantity of bitter components and acids that can adversely affect the flavor and fragrance of the extract. In some embodiments, more than one different grade of extract may be produced from a given quantity of ground roasted coffee, with each extract produced at a different level of exhaustion of the coffee. As described in more detail below, these extracts can be concentrated and combined in a variety of ways to yield combined extracts having a variety of flavor/fragrance characteristics.

Coffee's sweetest flavors are typically produced during the first part of any brewing (extraction) cycle for typical prior art methods. Rich flavors, sugars, and aroma are extracted first. Oils, acids, and more bitter flavor components brew out in the later phase of brewing when more extensive extraction has occurred. This, for example, is why some percolated coffee beverage and coffee extract produced by exhaustive extraction is often bitter in flavor, has weak aroma, and has oils on the surface.

For applications where coffee extracts having superior fragrance and flavor are typically not considered crucial, for example for production of instant coffee products, exhaustive extraction with hydrolysis has been utilized in an attempt to maximize the total yield of consumable material (i.e. soluble coffee solids) that can be obtained from a given quantity of solid raw material (i.e. roasted coffee). However, because of harsh extraction conditions and solvent removal conditions often employed in these prior art processes, when reconstituted with water or another solvent to form a coffee beverage or coffee extract for use as a food, flavoring, or fragrance component, such prior art products typically do not provide the flavor and/or fragrance characteristics demanded by consumers who appreciate superior quality coffee. Specifically, these prior art exhaustive extraction methods typically produce coffee extracts that do not retain the desirable varietal flavor and fragrance components that can distinguish extracts produced from coffee grown in one particular region or country or blends of two or more such coffees over other, different varieties. The extracts produced according to the present invention can provide flavor and fragrance attributes that enable them to be utilized in "specialty" coffee applications, and for those embodiments designed for such specialty coffee applications, retain an effective amount of the varietal flavor and fragrance components characterizing the particular variety of roasted coffee from which the extract was produced. The varietal flavor and fragrance components, advantageously retained in coffee extracts produced according to these embodiments of the invention, are relatively volatile extractable chemical compounds, or combinations of chemical compounds, present in the roasted coffee. Different coffee varieties (e.g. Costa Rican Tarrazu vs. Sumatran Mandheling), or defined mixtures or blends of such varieties, will typically possess different relative amounts of and/or types of these varietal flavor and fragrance components that distinguishes the flavors and fragrances of the different brewed coffees. The presence of these varietal flavor and fragrance components is conventionally determined by cupping (taste and smell testing) by those skilled in the art. Unlike typical prior art methods of producing relatively concentrated coffee extracts, which do not contain effective amounts of these varietal components, the present invention can provide relatively concentrated coffee extracts that do retain effective amounts.

"Relatively concentrated coffee extract" as used herein, refers to a coffee extract that is more concentrated than coffee beverage-strength extract (typically about 1-4% wt. dissolved coffee solids) and contains at least about 6% wt. dissolved coffee solids. An "effective amount" as used herein in reference to the amount of varietal components retained in a coffee extract refers to a concentration of such components in the extract sufficient to be detected, in the concentrated extract itself or in a coffee beverage obtained by diluting the extract to beverage strength with additional water, by taste and/or smell by one of ordinary skill in the art of cupping (taste-testing) coffee. "Detected" as used above refers to the ability of such a taste tester to distinguish, due to the presence of the varietal components, extracts produced by the same method but from different varieties of roasted coffee. Alternatively, the presence of an effective amount of varietal components can be determined and defined by performing standard chemical analysis on the coffee extracts. Such analysis can be performed by a variety of methods apparent to one skilled in the art, for example, gas chromatography, liquid chromatography, mass spectrometry, etc. An "effective amount" of varietal components as measured by such methods can be defined by comparing the analysis of a beverage-strength extract produced by a typical prior art beverage brewing method, such as the drip method or espresso method, both discussed in more detail herein, with a concentrated extract that has been diluted with additional water to have the same total dissolved solids as the beverage-strength extract to which it is being compared. A diluted concentrated extract so analyzed with an "effective amount" of varietal components, will contain about the same or greater concentration of such components as the beverage-strength extract produced by the typical prior art beverage brewing method.

In addition, because the inventive methods provide flexibility to produce coffee extracts having a wide range of solubles concentration, including highly concentrated extracts, many of the extracts produced according to the invention can, in some embodiments, be used directly for applications where highly concentrated coffee extracts are desirable, without the need for additional concentration by solvent removal. For example, concentrated coffee extracts produced according to some embodiments of the invention can be used for producing coffee syrups, coffee ice creams, iced coffee beverages, coffee perfume, etc., all of which can display excellent flavor, sweetness, and/or fragrance and maintain the varietal characteristics of the coffee from which the products were produced. For other embodiments where it may be desirable to even further concentrate the extracts produced by extraction of the ground, roasted coffee, the invention provides novel filtration-based methods, for example reverse osmosis methods, for removing excess solvent (e.g. de-watering) from the extract, preferably without unduly degrading the flavor and fragrance qualities of the dilute extract. Such solvent removal methods can be especially useful for forming concentrated extracts in embodiments involving exhaustive or relatively high levels of extraction of the ground, roasted coffee with relatively large quantities of extraction solvent.

The current invention also provides methods and apparatus that are flexible enough to allow for production of a wide variety of extracts having different concentrations and degrees of extraction to suit a variety of purposes and applications. The inventive methods and apparatus are also easily scalable to provide a means for producing any desired quantity of extract. Small-scale versions of the apparatus, according to the invention, could be used for home or retail/commercial use, while larger scale apparatus, more specifically described herein, may be used for industrial production of coffee extracts.

The current methods for forming extracts and for de-watering extracts, according to the invention, allow the level of extraction, and concentration of coffee extract to be more precisely controlled than with typical prior art devices and methods. For example, typical drip-style coffee brewers, commonly employed for home and commercial use, typically produce about 2.5 gallons of coffee beverage per 1 lb. of ground roasted coffee, yielding a typical dissolved solids concentration of about 1-1.5% wt. Another popular method of producing coffee beverage is the "espresso method," which typically involves forcing hot water through finely ground, roasted coffee under pressure (typically about 120-140 psig depending on the fineness of the grind and the water flow rate) over a short period of time to create an "espresso beverage." Such methods typically create about 1 gallon of coffee beverage from about 1 lb. of coffee and produce a beverage containing up to about 4% wt. dissolved coffee solids. In general, the "espresso method" typically produces a sweeter, more concentrated beverage than the drip method because it utilizes a greater ratio of coffee to water, while also reducing the level of extraction of the raw material (ground coffee). Apparatus for producing coffee beverage according to the espresso method is typically limited to small scale devices having a maximum capacity of about 14 grams of dry, ground roasted coffee. In contrast, the present invention provides, in certain embodiments, methods and apparatus for producing coffee extracts from large quantities, in some embodiments 300-1300 lb., of roasted coffee. The invention also allows for a variety of coffee extracts having a variety of flavor/fragrance characteristics and/or concentrations to be produced according to the needs of the user by allowing the user to easily adjust the ratio of extract produced to roasted coffee employed according to need. For example, the extracts produced according to the invention can range from those of drip coffee strength (1 lb. dry coffee per 2.5 gallons of extract) or less, to highly concentrated extracts, for example using 2.5 lb., 5 lb, 7 lb., 10 lb., 15 lb., 20 lb., 25 lb., 30 lb., or 40 lb. of dry coffee or even more, per 1 gallon of extract produced, yielding concentrations of dissolved coffee solids that can be in excess of 10% wt., 15% wt., 20% wt., 25% wt., 30% wt., or 40% wt. The flavor and fragrance quality of the extracts produced according to the invention varies according to the degree of dilution and extraction during the extraction process, with extracts produced at lower levels of extraction of the roasted coffee typically having the greatest sweetness, and extracts produced at higher levels of extraction and greater solvent dilution, which extracts can subsequently be concentrated by filtration/reverse osmosis as described in more detail below, having more bitter and acidic flavor components. As described in more detail below, for certain applications, extracts produced at relatively low levels of extraction can be selectively combined with extracts produced at higher levels of extraction to produce combined extracts having a desired level of balance of sweetness and flavor/fragrance qualities. Such extracts can be selectively formulated to yield a flavor/fragrance balance for particular applications; for example, in one preferred embodiment, a quantity of high-sweetness extract produced at a low level of extraction can be combined with an extract produced at a higher level of extraction, and subsequently de-watered to a solubles concentration level similar to that of the high-sweetness extract, to produce a concentrated extract which yields a well-balanced, flavorful coffee beverage upon reconstitution of the extract with sufficient water to yield beverage strength coffee.

The basic features of the inventive methods for producing consumable extracts from solid raw materials will now be explained in reference to the formation of coffee extracts. Following the basic description, a more detailed description of each step will be given with reference to one illustrative embodiment of an extraction apparatus shown in FIGS. 1-4.

The inventive extraction methods, in some embodiments, are similar, in some respects, to the "espresso method" of coffee extraction previously described. The inventive method utilizes an extraction vessel, chamber, or enclosure having an enclosed internal volume sufficient to contain a desired quantity of solid raw material, for example roasted coffee. A wide variety of extraction vessel sizes and configurations can potentially be employed for various applications as apparent to the skilled artisan. The vessel should be sealable, so that the internal volume can be pressurized to a desired level without undesirable leakage, and have at least one inlet line and at least one outlet line for fluid flow therethrough to enable a continuous flow of solvent through the solid raw material (e.g. coffee) contained within the internal volume of the vessel. The vessel should also have means for filling the internal volume with roasted coffee; for example, the vessel can comprise two or more separable parts that may be separated to expose the internal volume for filling, and/or may have one or more lines through a wall of the vessel and in communication with the internal volume through which roasted coffee may be inserted into the internal volume. The inlet and outlet lines for fluid flow are preferably located on the vessel on opposite sides of the internal volume containing the coffee so that essentially all of the fluid flow entering the vessel through the inlet line and leaving the vessel through the outlet line passes through essentially the entire quantity of coffee as it flows through the vessel. A preferred configuration of the vessel has one or more inlet lines located at or near a top surface of the vessel and one or more extract outlet lines located at or near a bottom surface of the vessel, thus allowing, in preferred embodiments, a flow of aqueous solvent through the coffee to proceed from above the level of the coffee in the internal volume and through the quantity of coffee in the internal volume in the direction of gravity. Such flow through the coffee in the direction of gravity acts to compress the coffee during flow-through extraction and improve contact between the solvent and the coffee, thus improving the extraction process performance as compared to a solvent flow against the direction of gravity or perpendicular to the direction of gravity.

One embodiment of a method for forming a coffee extract according to the invention involves first at least partially, and preferably essentially entirely, filling the internal volume of the vessel with roasted coffee. With the certain lines closed and at least one valve on a line in fluid communication with the internal volume of the vessel open, the vessel is at least partially filled with an aqueous solvent. The aqueous solvent can be filled, in some embodiments, through inlet line(s) on the top of the vessel, or, more preferably, at least a portion of the initial filling of the vessel with aqueous solvent can be performed by flowing the aqueous solvent into the vessel through one or more lines positioned near the bottom of the vessel, for example below the filter screen used, in other steps of the extraction process as extract outlet lines or washout lines. This latter filling process can help reduce potential clogging of the filter screen (see FIG. 3 and discussion below) with fines of the roasted coffee by back-flushing the screen during initial filling with aqueous solvent.

Preferably, enough aqueous solvent is added to fill the void volume of the quantity of roasted coffee in the vessel and completely cover and wet the roasted coffee. The outlet lines are preferably closed through means of at least one controllable valve. A "controllable valve" as used herein refers to a valve that may be manually or automatically operated, for example by hand turning or computer control and actuation, as desired by an operator to open, close, and/or partially open or close the valve at any desired time and under a variety of desired operating conditions. Such valves may be gate valves, globe valves, ball valves, needle valves, etc. as apparent to the skilled artisan and are distinguished from valves which open and close at one preset condition without operator control, such as, for example, a biased pressure relief valve. In preferred embodiments, the temperature of the aqueous solvent in contact with the coffee is above ambient temperature, most preferably, it is between 190 and 212 degrees Fahrenheit.

Preferred embodiments of the extraction method, subsequent to the filling steps outlined above, next subject the roasted coffee to a novel "pressure-treat" step, which facilitates thorough wetting of the coffee and the elimination of air pockets or channels, as well as penetration of the aqueous solvent into the coffee particles themselves to increase the efficiency of extraction. The pressure-treat step is performed by increasing the static pressure in the vessel containing the coffee and aqueous solvent to a predetermined and controllable pressure above atmospheric pressure while maintaining the outlet valves in a closed configuration so as to prevent any flow of extract from the vessel. The vessel can be pressurized by addition of additional pressurized aqueous solvent, or alternatively by addition of a pressurized gas to the vessel from an external source of pressurized gas through an inlet line to the vessel. The pressure is maintained for a desired period of time before flow of extract is established. The optimal level of pressure for use in this "pressure-treat" step depends on whether the roasted coffee is in the form of whole beans or ground, the fineness of the grind (for ground coffee), the type of coffee, the degree of roasting, etc., and should be determined by the operator, using routine experimentation and/or optimization, for a given set of conditions to produce an extract with desired characteristics. In general, the coarser the grind of coffee, the higher the pressure should be to yield maximum benefit from the pressure-treatment. It has been found that for many types of ground coffee (e.g. roasted coffee ground using a Bunn coffee grinder (HVG, Bunn-o-matic, Springfield, Ill., on a setting of 4.0, or roasted coffee ground to a similar average coarseness using a roller mill grinder) the pressure during the pressure-treat step is preferably at least about 40-50 psig, in some embodiments at least about 100 psig, and, in certain preferred embodiments, between about 120 and 132 psig. For embodiments where coarser ground coffee or whole bean coffee is used, the pressure is preferably higher than this range, for example 150-1000 psig or more. The pressure is maintained under non-flow conditions for a predetermined and controllable period of time before the onset of flow. The time of treatment can vary from several seconds to several minutes, with a typical static pressure treatment time being about 10-30 min.

Upon completion of the static pressure-treat step, an outlet valve is at least partially opened to establish flow of extract from the vessel, and, for some embodiments, additional aqueous solvent is simultaneously fed to the vessel through an inlet line. The valve on the outlet line can be controlled to maintain a desired level of pressure within the vessel during the flow-through extraction. Thus, the ability of the operator to select and control the pressure in the vessel via control of an outlet valve allows the pressure during extraction and to be adjusted and controlled within the vessel independent of the fineness of the grind of coffee or the inlet solvent and/or gas flow rate. For embodiments where a very concentrated extract is desired, very little or no additional aqueous solvent is supplied during flow of the extract from the vessel. For other embodiments, a measured, desired quantity of additional aqueous solvent is supplied to yield a desired level of extraction and final extract concentration.

After a desired quantity of additional solvent has been supplied, the flow of solvent is discontinued and extract is collected through the outlet line, typically until the vessel is equilibrated with atmospheric pressure. At this point, in preferred embodiments of the method, residual extract present within the void volume of the ground coffee is removed and recovered by supplying the vessel with a flow of fluid that is a gas (at standard temperature and pressure) through an inlet line to the vessel, which is in direct fluid communication with the enclosed internal volume, from a source of compressed gas external to the vessel. The gas flow to the vessel displaces the extract from the wet coffee, which extract is collected from the outlet line and added to the extract collected during the previous step. Purging the wet coffee with a gas allows the concentrated extract present within the void volume, defined by interstices between and within the wet coffee particles, to be recovered instead of wasted as in typical espresso-type coffee extractors. It also allows for a given volume of extract to be collected with less dilution and a lower degree of extraction when compared to prior art methods where all of the extract collected is forced from the coffee with additional solvent. The gas used to purge the coffee, in preferred embodiments, does not act as a solvent and, therefore, does not further extract or dilute the coffee extract collected. Preferred gases for use in the invention are relatively inert with respect to the solvent, extract, and solid raw material. Compressed air may be used in this context, but particularly preferred gases include oxygen-free inert gases such as nitrogen, or noble gases such as argon, helium, etc. "Inert gas" as used herein, refers to gases that are not reactive with the solid raw material, aqueous solvent, and aqueous extract and that do not significantly affect the flavor or fragrance characteristics of the aqueous extract. Preferred gases, so as not to adversely affect the flavor of the extract, are also essentially insoluble, only sparingly soluble, or not very soluble in the aqueous solvent. For example, gases such as carbon dioxide, which is very soluble in the aqueous solvent and causes "carbonation" thereof, are generally not preferred for use in the invention. It is also preferable to supply the gas to the vessel at ambient or sub-ambient temperature so as to beneficially cool the solid raw material and prevent release of off-flavors/fragrances into the extract.

The steps of the inventive method outlined above may be modified, or certain steps may be deleted, or additional steps added, according to the needs and desires of the operator. For example, in some embodiments of the method, the static pressure-treat step can be omitted. In such an embodiment, after filling the internal volume of the vessel with dry roasted coffee, a continuous flow of aqueous solvent can be established through the coffee whose dynamic pressure drop is controllable by adjustment of the controllable outlet valve on the outlet line through which extract is collected, and/or by controlling the inlet flow rate of aqueous solvent. Then, after supplying a desired predetermined volume of aqueous solvent for extraction, the solvent flow is discontinued and the extract remaining in the wet coffee is purged with a gas as previously described. In some embodiments where a particularly concentrated extract is desired, the predetermined volume of aqueous solvent supplied as described above is essentially equal to the void volume of the bed of the dry, roasted coffee contained within the vessel.

The inventive methods outlined above are also flexible and can be used to provide a variety of extracts of differing concentration and degree of extraction from a single quantity of solid raw material. For example, the same quantity of solid raw material can be subjected to multiple, repetitive application of the methods described above to produce a variety of extracts from the same given quantity of solid raw material, each extract having a different concentration and flavor/fragrance characteristics indicative of the degree of extraction, with the extracts produced by the first-pass extraction procedure being the most concentrated and having the sweetest flavor/fragrance characteristics, and with subsequent extracts being progressively weaker and including more bitter and acidic taste/flavor components. Using such a multi-cycle method to perform multiple extractions can allow for custom production of a variety of extracts for a variety of purposes, with even more extracts being obtainable by selective combinations of two or more of the above extracts, while at the same time increasing the utilization and yield from a given batch of raw material. The modified, multi-cycle method here described can be analogous, in some embodiments, to the production of various quality olive oils (e.g. extra virgin, virgin, etc.) from multiple pressings of the same olives. In the present case, various quality coffee extracts can be produced from multiple cycles utilizing the same batch of roasted coffee. In addition, if desired, the extract produced from one cycle of the extraction can be recycled and used as the aqueous solvent for a subsequent extraction cycle either with the same charge of solid raw material or a fresh load of solid raw material.

Also, as described in more detail below, the extracts produced at higher levels of extraction of the roasted coffee, which are typically more diluted with aqueous solvent, can, in some embodiments, be advantageously concentrated in coffee solids by removing a portion of the aqueous solvent from the extract as a permeate using the inventive filtration methods, so that they have a solids concentration similar to or exceeding that of the extract produced by the first-pass extraction. Blended extracts, having more balanced sweet/bitter flavor/fragrance characteristics, can then be produced by selective mixing of first-pass extracts with subsequent extracts that have been concentrated without any dilution in the overall solids concentration. Alternatively, the extracts may be mixed together after extraction and prior to de-watering, and the combined extract then subjected to de-watering to a desired final coffee solids concentration. Furthermore, the aqueous solvent removed from the extracts by certain of the inventive filtration methods, such as reverse osmosis or nanofiltration, may contain substances (e.g. caffeine) that render it commercially valuable as a product. The aqueous solvent removed as permeate from the extracts by certain inventive filtration methods, such as reverse osmosis, may also have enhanced solvation power for performing subsequent coffee extractions owing to the solvent having a lower level of mineral hardness. Such a permeate can be re-used, in some embodiments, as the aqueous solvent, or a component thereof, for performing subsequent extraction cycles on a previously extracted quantity of roasted coffee, or can be used as the aqueous solvent, or a component thereof, for performing a new, first-pass extraction on a fresh charge of roasted coffee.

One embodiment of an industrial-scale extraction apparatus and system 10 for performing the methods according to the invention is shown schematically in FIGS. 1-4. It should be noted that some components that would be apparent to the skilled artisan are not necessarily shown in the figures, and that the particular arrangement of components is only illustrative, which components may be repositioned, or otherwise interconnected, substituted, or combined as apparent to the skilled artisan. Referring first to FIG. 1, the apparatus includes a cylindrical pressure vessel 11 having a removable top plate 12 and a removable bottom plate 13. The apparatus can be disassembled to allow for inspection, clean out, and/or replacement of internal components. In other embodiments, especially for small-scale systems, the vessel may be a single component that does not disassemble. Top plate 12 and bottom plate 13 are attached to integral flanges on the main cylindrical body 11 via a plurality of connectors 14, which may be of the nut and bolt type. Typically, a sealing gasket or washer will be included between the plates 12 or 14 and the flanges on the body 11 to make a pressure-tight seal. While the top and bottom plates in the illustrated embodiment have an essentially flat, plate-like configuration, in other embodiments, especially for very large capacity extractors, for example those able to hold 1000 lbs. or more of solid raw material, one or both of the top and bottom "plates" may have a dome-like, semi-hemispherical shape to enable it to withstand higher pressures for a given cross-sectional thickness. In some embodiments, where disassembly of the vessel is not critical, the top and/or bottom plates may be integrally formed with the main cylindrical body, or attached thereto with a permanent attachment means, such as by welding, to increase the leak resistance of the vessel and/or eliminate the need for gaskets and connectors. The vessel, and other components in contact with the aqueous extract or aqueous solvent, are preferably constructed of a substance that is relatively inert and non-reactive, such as, for example stainless steel. The pressure vessel 11 is constructed and arranged to withstand maximum foreseeable operating pressures. In one particular embodiment as shown, the vessel 11 can be sized to hold about 300 lb. of roasted coffee. The internal volume 75 of the vessel 11, shown in the cross-sectional view of FIG. 4, can have an internal diameter of about 24 inches, a height of about 48 inches and a volumetric capacity of about 12.5 cubic feet (about 90 gallons). The vessel is supported on a firm, solid surface 16 by a plurality of support legs 15. In another exemplary embodiment, the vessel can be sized to hold about 1300 lbs. of roasted coffee, can have an internal diameter of about 38 inches, a height of about 96 inches, and a volumetric capacity of about 62.5 cubic feet.

Referring to FIG. 1, coffee, or another solid raw material, is inserted into the vessel 11 through one or both of raw material lines 17 and 19 each in communication with an orifice through top plate 12. Each raw material line includes a valve, 18 on line 17, and 20 on line 19, that may be opened to insert coffee, and subsequently closed to seal the vessel 11. Typically, when inserting the coffee into the vessel 11, the coffee is inserted through at least one valve, while at least one other valve on the apparatus is open to the atmosphere to allow displaced air to escape. In other embodiments, instead of the extractor being provided with two raw material lines, a single raw material line, preferably centered in the top plate, may be provided. In some embodiments, especially for very large extractors, the roasted coffee may be inserted into the vessel by feeding the roasted coffee to the raw material line(s) with a screw auger, or other type, feeder (not shown), which can be mounted to a valve (e.g. 18 and/or 20) included on the raw material feed line. In certain such embodiments, the screw auger, or other type feeder can be operated automatically to fill the vessel and discontinue feeding when the vessel is filled to a desired, predetermined level. In such an embodiment, the vessel can also include a level sensing probe (not shown), such as those commonly employed in the food and dairy arts for detecting the level of materials in tanks, which may be electrically coupled to a controller that is programmed/configured to shut off the feeder when a desired, preset level of material is detected in the extractor.

Figure 2:
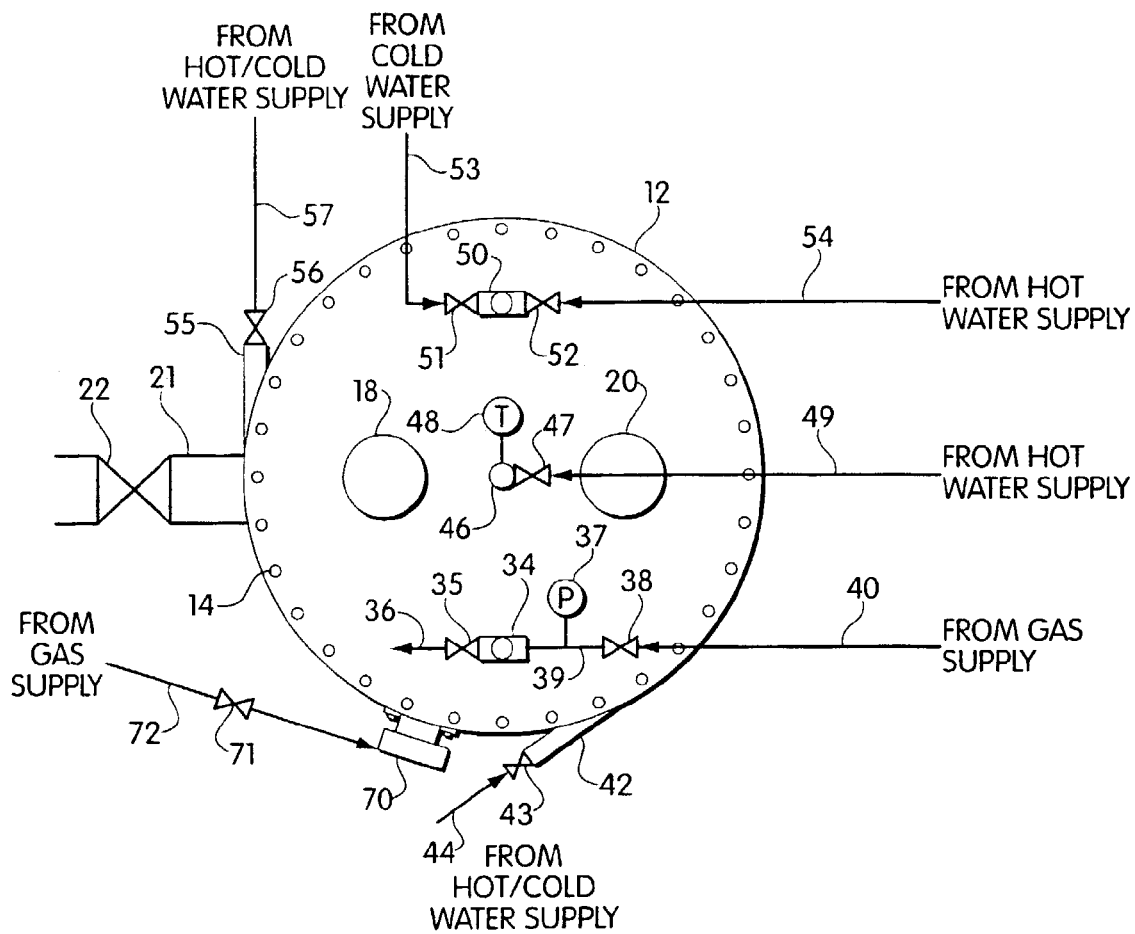
FIG. 2 is a schematic illustration of the apparatus shown in FIG. 1 as viewed from the top.

The positioning of the raw material lines is more clearly seen in the top view shown in FIG. 2. In other embodiments, the lines may be positioned differently from that shown, or the apparatus may have more, fewer, or no raw material inlet lines. For example, for some very large extractors, it may be beneficial to include four, or more, raw material inlet lines to decrease the time required to fill the vessel. As previously discussed, for some extractors, a single raw material inlet line may be provided, or, for small scale extractors, the vessel may have no raw material inlet lines, in which case, the vessel would need to be disassembled to be filled with solid raw material.

While the vessel 11 is being filled with the solid raw material, in some embodiments, the vessel can be agitated in order to promote settling of the material within the internal volume 75 of the vessel. For the embodiment shown in FIG. 1, agitation is provided by a gas-operated bin vibrator 70 connected to an external supply 41 of gas via line 72 and valve 71. For embodiments utilizing a bin agitator, it is preferred that the bin agitator is located at a location positioned at a distance from the bottom plate 13 about one third the height of the vessel. Other embodiments of the apparatus 10 do not include the bin vibrator. In such embodiments, agitation may be provided if desired, for example, by striking the vessel 11 with a rubber or wooden mallet, or by placing the apparatus on a vibrating platform. Alternatively, instead of distributing and settling the solid raw material through use of agitation, a distributor element could be included within the internal volume 75 of the vessel 11 to accomplish the same purpose.

Figure 4:
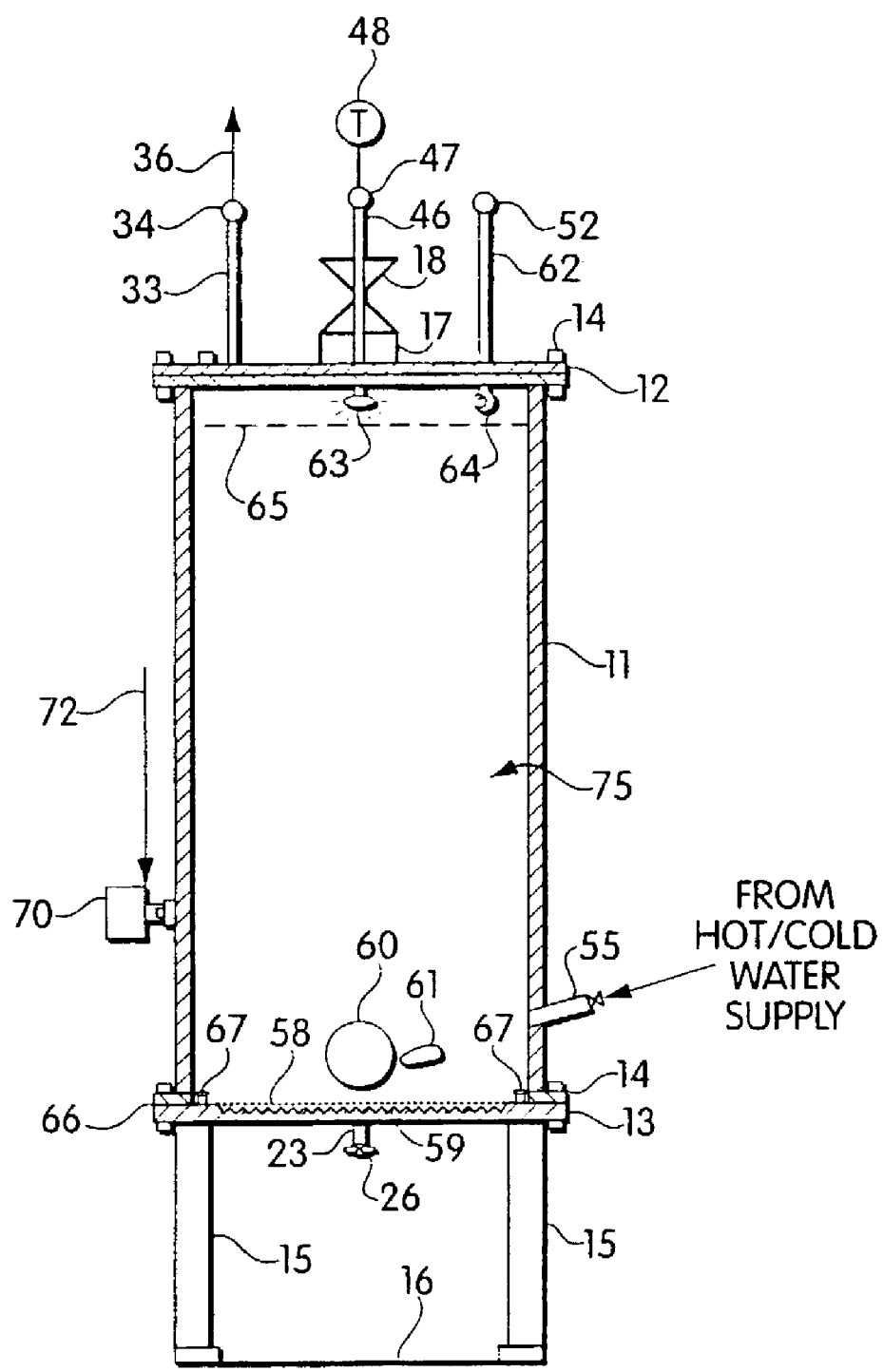
FIG. 4 is a cross-section of the apparatus of FIG. 1 viewed from the side showing the enclosed internal volume and internal components of the vessel.

As shown in FIGS. 1, 2 and 4, the apparatus 10 also includes an aqueous solvent inlet line 46 (see FIGS. 2 and 4) in fluid communication with an external source of hot water 32 via line 49 and valve 47. Included on line 46 is a temperature reading device 48 to measure the temperature of the fluid in line 46 and/or the temperature of internal volume 75 of the vessel 11. In the embodiment shown, the temperature of internal volume 75 of the vessel 11 is controlled by controlling the temperature of the hot water supply 32. In alternative embodiments, especially those involving relatively small-scale extractors, vessel 11 may be directly heated, for example by a steam jacket or hot water jacket, or by integral electrical resistance heating or other heating methods apparent to the skilled artisan. As shown in FIG. 4, aqueous solvent inlet line 46 is in fluid communication with a spray head 63 located within the internal volume 75 of the vessel 11. Spray head is constructed and arranged to relatively evenly distribute the hot water over the top of the bed of solid raw material formed in the internal volume 75. A variety of industrial spray heads can be used for this purpose, such as a multiple stream solid washing nozzle (Lechler, St. Charles, Ill.). The outlets of the spray head will preferably be positioned above the typical fill line 65 of the bed of solid raw material.

Also included on the top plate 12 of the vessel 11 is a gas inlet/vent line 33 (see FIG. 1) including a tee connector 34. Tee connector 34 is in fluid communication with an external source of compressed gas 41 via lines 39 and 40 and valve 38, and also with the atmosphere via valve 35 and vent line 36. In alternative embodiments, instead of having a single inlet line in fluid communication with both a source of compressed gas and a vent line via a tee connector, the vessel could instead be provided with two separate lines that communicate directly with the internal volume 75 of the vessel. Having a single inlet line in fluid communication with two external lines that are not simultaneously used, as shown, reduces the number of perforations that need to be-made in the plates 12 and 13 of the vessel 11. While filling the internal volume 75 of the vessel 11 with aqueous solvent through line 46 in top plate 12 and/or through line 23 in bottom plate 13, and/or through tangentially directed line(s) 42 and/or 55, line 33 can be used to vent or "burp" displaced air from the vessel by closing valve 38 and opening valve 35. In embodiments including, as mentioned above, automatic level detection within the vessel, a level detection probe within the vessel can be configured to detect the liquid level contained within the vessel, and to control burp valve 35 and the valve(s) on the aqueous solvent feed line(s) through which aqueous solvent is fed to the vessel to perform the above-described fill/burp procedure under automatic control. While pressurizing the internal volume 75 of the vessel during the pressure-treat step or while purging residual extract from the bed after extraction, line 33 can act as a gas inlet line by closing valve 35 and opening valve 38. Line 39 includes a pressure measuring device 37 that is used to measure the pressure of the internal volume 75 of the vessel 11 during operation.

As shown in FIG. 1, included on bottom plate 13 is an extract outlet line 23 in fluid communication with the internal volume 75 of the vessel 11 via a drain hole in bottom plate 13. Aqueous extract exits vessel 11 via line 23 passes through tee 24, controllable valve 25, and line 27 to a chiller 28 that reduces the temperature of the extract to a temperature below room temperature to prevent degradation to the flavor and/or loss of fragrance. The chilled extract exits chiller 28 via line 29 and can be collected in a container 30. In preferred embodiments, container 30 is a sealable container whose headspace is filled and/or flushed with an inert gas, such as nitrogen, in order to prevent exposure of the extract to atmospheric oxygen. As described in more detail below in the context of FIGS. 6-8, container 30 can also serve as the feed container to the inventive solvent-removal filtration system utilized, in some embodiments, for concentrating the coffee extract. Also in fluid communication with tee 24 and line 23 via valve 26 and line 31 is hot water supply 32; hot water supply line 31 can be used, in certain embodiments, for filling the vessel with aqueous solvent through line 23 after filling the vessel with roasted coffee, as previously described, and, in addition, these lines are used in connection with the novel spent material flush out methods described in more detail below.

Figure 3:
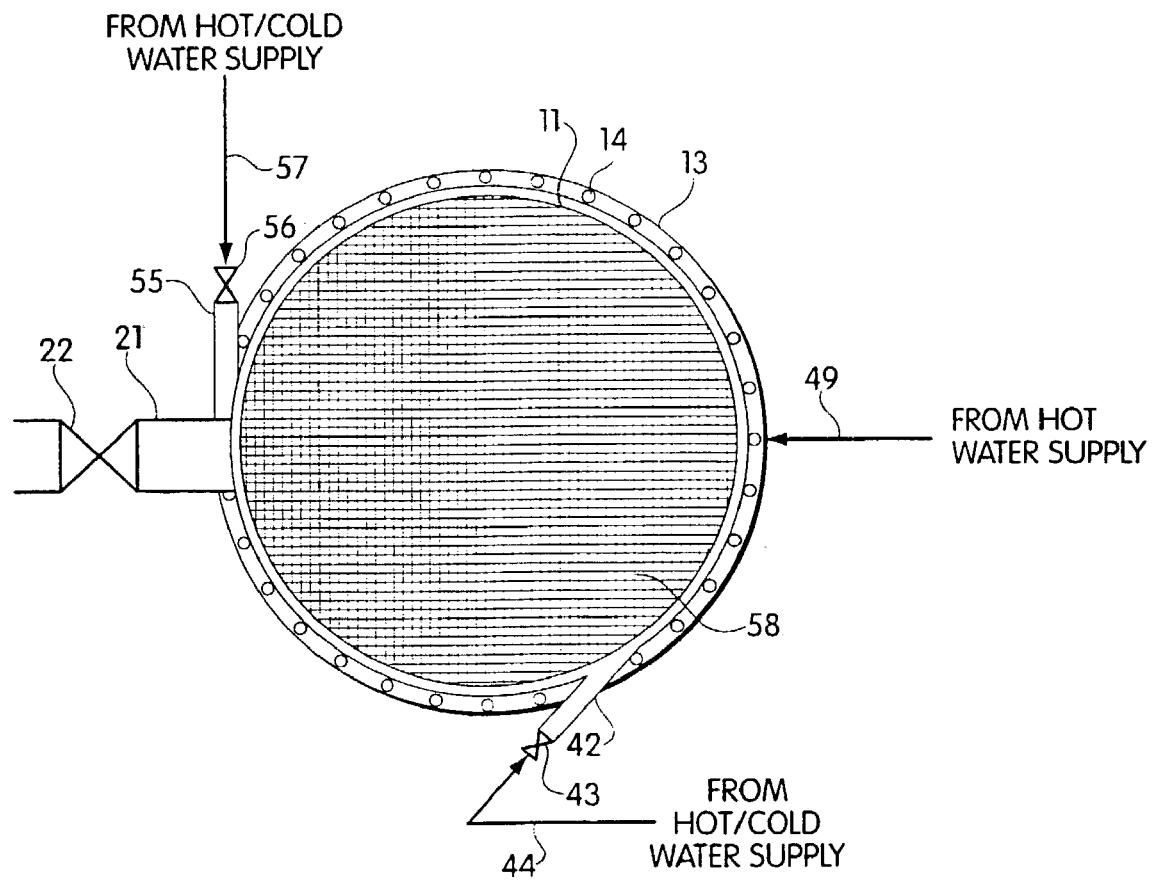
FIG. 3 shows a cross-section of the apparatus in FIG. 1 as viewed from the top showing one embodiment of a filter element comprising a porous screen.

In order to prevent the solid raw material from exiting the vessel via line 23 during flow-through extraction, a filter element is included within vessel 11 upstream of line 23. A preferred arrangement of filter element is shown in FIG. 3 and, in cross-section, in FIG. 4. The preferred filter element includes of a porous screen 58 having openings therein that are small enough to retain essentially all of the solid raw material. In one preferred embodiment, the porous screen comprises a commercially available (e.g. U.S. Filter, Johnson Screen Division, St. Paul, Minn., Model 63V, having a slot size of 0.020") wedge wire type screen, with a surface oriented facing the bed of solid raw material, having about 25% open space. As shown more clearly in FIG. 4, porous screen 58 is supported by bottom plate 13, which plate includes a plurality of channels and grooves 59 constructed and arranged to direct the flow of aqueous extract that passes through porous screen 58 to aqueous extract outlet line 23. Porous screen 58 provides a support, and means of retention for the bed of solid raw material and has a diameter that is preferably essentially equal to the internal diameter of vessel 11. Porous screen 58 can be attached to bottom plate 13 via screws 67, or any other appropriate connecting means. In some other embodiments, the filter element may be positioned elsewhere in the internal volume 75. In other embodiments, the filter element could be a smaller screen or filter positioned directly upstream of, or even within extract outlet line 23. A wide variety of arrangements of the filter element are possible as would be apparent to the skilled artisan; all of which are included within the scope of the invention.

As previously mentioned, extraction apparatus 10 also includes a novel arrangement of components for flushing spent solid raw material from the internal volume 75 of the vessel 11, and for cleaning out the vessel after an extraction has been performed and prior to a subsequent extraction. The arrangement of components illustrated allows spent raw material to be flushed from extraction apparatus 10, and allows for clean-out without the need for disassembly of the apparatus. In the illustrated embodiment, as shown in FIG. 1, the wash-out system includes spent material outlet waste line 21, including valve 22, that is in fluid communication with a waste collection system, such as a sewer. As shown in FIG. 4, outlet port 60, opening into the internal volume 75 of the vessel 11 from line 21, is preferably positioned directly above porous screen 58. In alternative embodiments, not shown, instead of outlet port 60 comprising an orifice through the side wall of vessel 11 positioned above the screen, the outlet port may instead be located in the bottom plate and communicate with the internal volume of the vessel, for the purposing of flushing out spent solid raw material, through a hole in the porous screen positioned adjacent to, and in fluid communication with, the outlet port in the bottom plate. For such alternative embodiments, a gasket, or other sealing means, can be included to fluidically isolate the spent material outlet port from the downstream side of the porous screen, where extract collects and flows from the extractor, in order to prevent contamination of the collected extract with spent solid raw material, as would be apparent to those of ordinary skill in the art.

A preferred wash out configuration includes a fluid supply line constructed and arranged to back-flush the filter element. In the illustrated embodiment, the back flush is performed through line 23 by first closing valve 25, and then opening valve 26 so that a fluid, in the illustrated embodiment hot water from pressurized hot water supply 32, will enter the vessel 11 via line 23, which now acts as an inlet flush line, and thereby back flush the porous screen 58. Typically, valve 22 will be open during the flush-out procedure to allow spent material to be removed from the vessel 11; although, in some embodiments, valve 22 may be closed during at least part of the flush-out procedure to allow the internal volume 75 of the vessel 11 to at least partially fill with liquid in order to disperse and fluidize the spent material. In alternative embodiments, line 31 may also be in fluid communication with a source of pressurized gas. In such embodiments, either gas, liquid, or a two-phase gas-liquid fluid can be used to back flush the filter element and wash out the spent solid raw material.

Also included in the preferred embodiment are additional tangential flush lines 42 and 55 (see FIGS. 1 and 3) which are in fluid communication with a source of pressurized cold water 45 via valve 43 and line 44 for flush line 42, and valve 56 and line 57 for flush line 55, and with hot water supply 32 via connection to lines 44 and 57, for example by connector line 44a and three-way valve 43a. As previously discussed, these tangential flush lines can also be advantageously used as hot aqueous solvent fill lines during initial filling of the vessel with aqueous solvent after filling with solid raw material at the beginning of the extraction process. Both lines 42 and 55 are positioned to be roughly tangent to the cylindrical wall of vessel 11 with openings (e.g. see FIG. 4 for opening 61 of line 55) into the internal volume 75 of the vessel 11 positioned vertically above the porous screen 58 at about the same height, in the illustrated embodiment, as the outlet port 60 to spent-material outlet line waste 21. The tangential orientation of the flush lines 42 and 55 with respect to the vessel walls tends to create a swirling, vortex-like flow pattern of wash fluid within the vessel, which assists in thoroughly removing the spent material from the vessel 11 via line 21. In addition, at least one of the tangential flush lines (line 55 in the illustrated embodiment) is preferably positioned so that the opening 61 of the line in the vessel wall directs a stream of flush fluid obliquely incident upon the outlet port 60, through which spent material exits the vessel 11, in order to drive the slurried material through line 21 to waste and prevent plugging of outlet port 60. In other embodiments, more than two tangential flush lines may be used to improve removal of spent material, for example for very large extractors, or alternatively only a single line may be used. For small extractors, tangential flush lines are typically not required to effectively remove the spent material from the vessel.

Also included, in the illustrated embodiment, and seen most clearly in FIGS. 2 and 4, is an optional wash down line 62 through top plate 12. Wash down line 62 is in fluid communication with a supply of pressurized cold and hot water via tee 50, and valve 51 and line 53 (cold water), or valve 52 and line 54 (hot water). Wash down line 62 is preferably connected to a rotating spray nozzle 64 that is positioned within internal volume 75 of the vessel 11. Rotating spray nozzle 64, when supplied with pressurized fluid, will rotate and spray fluid in order to effectively wash down the walls and internal surface of the top plate 12 and the vessel 11. A variety of commercially available rotating spray nozzles can be used for this purpose. The illustrated embodiment employs a whirling tank nozzle (Lechler, St. Charles, Ill.). Other embodiments may include additional wash down lines and rotating spray nozzles, while, in yet other embodiments, wash down line 62 may be eliminated, and wash down may be performed by utilizing line 46 and spray head 63 alone. In some embodiments, the water employed for washing purposes may include one or more cleaning and/or corrosion inhibiting agents as known in the art.

Operation of the Extraction Apparatus

With reference to the apparatus illustrated by FIGS. 1-4, an exemplary coffee extraction procedure using the above described apparatus can proceed as follows. At the start of the procedure, all valves are in a closed position. The vessel 11 is then preheated by opening valve 52 to establish a flow of pressurized hot water into the vessel through rotating spray nozzle 64. When the pressure within the vessel, as read by pressure measuring device 37, is approximately equal to that of the hot water supply pressure, valve 25 downstream of extract outlet line 23 is opened to establish a flow of hot water to drain or chiller 28, and then valve 52 is closed. Valve 38 is then opened to supply pressurized gas, preferably an inert gas, such as nitrogen, to the vessel via line 33. The gas flow is maintained until no more liquid is observed leaving the vessel. The gas flow is then discontinued by closing valve 38, and the vessel is equilibrated to atmospheric pressure. Valve 25 downstream of extract outlet line 23 is left open.

A desired quantity of dry coffee is next added to the vessel by opening valves 18 and 20 on raw material lines 17 and 19 and pouring or feeding coffee into the vessel through lines 17 and 19 until the vessel is essentially full. The dry coffee can then be settled by opening valve 71 to supply gas flow to bin vibrator 70, or alternatively, tapping the vessel with a mallet, if desired. Alternatively, the coffee can be settled without agitation of the vessel by briefly opening valve 52 and/or 47, and/or 26, and/or 43, and/or 56 to apply hot water to the coffee at one or more intervals during the addition of dry coffee, or after the coffee has been added, to moisten and settle the coffee. If desired, more coffee may now be added to more completely fill the vessel before closing valves 18 and 20. Valve 47 is then partially opened to supply pressurized hot water to the vessel via aqueous solvent inlet line 46. Upon the first sign of extract discharge from line 29, valve 25 downstream of extract outlet line 23 is closed and the vessel is filled with a desired quantity of hot water. Valve 35 on vent line 36 is at least partially opened, either manually or via automatic control, at some point during the process of filling the vessel with water to "burp" out gas; the valve 35 is closed when extract is observed to flow from line 36. The volume of hot water added to the coffee is preferably equal to or greater than the void volume of the bed of coffee so that all of the coffee is wetted. In some embodiments, the volume is essentially equal to the void volume present in the bed. As discussed above, the vessel can also be filled with hot aqueous solvent at this stage through one or more of lines 46, 23, 42, and 55. The vessel is then further pressurized, either with pressurized hot water by opening valve 47, or with pressurized gas by opening valve 38, to a desired pressure (typically about 40-132 psig) for performing the static pressure-treat step. The pressure is maintained in the vessel without flow for a desired period of time (typically about 10-30 min.). Next, valve 25 downstream of the extract outlet line 23 is controllably opened to initiate a desired flow rate of extract through line 27 and chiller 28 and into collection container 30. For some embodiments during this step, depending on the desired strength of the extract and degree of extraction, valve 47 can be opened and a measured quantity of hot water can be added to the vessel to further extract the coffee within the vessel via a flow-through extraction step. During such flow-through extraction, the pressure within the vessel can be controlled by adjusting valve 25 on the extract outlet line 23, and/or valve 47 on the hot water inlet line 46. For embodiments where additional hot water has been added after the pressure treat step, after the desired quantity of additional solvent water has been supplied during the flow-through extraction, valve 47 is closed to discontinue flow from the hot water supply. Valve 38 is then opened so that compressed gas enters the vessel via line 33 in order to purge residual extract from the void volume of the bed of coffee. Valve 47 is closed when gas flow is observed from extract collection line 29. At this point, extraction is complete and the vessel may be reused for a subsequent extraction with the same charge of coffee to produce an extract having more bitter/acidic flavor/fragrance characteristics of a more exhaustively extracted roasted coffee, or the spent coffee can be removed from the vessel. For embodiments where a maximum-strength extract is desired, the extract can be purged from the bed with the gas flow immediately after the pressure-treat step without supplying additional hot solvent water for a flow-through extraction step.

In order to remove the spent grounds from the vessel, valve 25 on the extract outlet line 23 is closed and valve 22 on spent material waste line 21 is opened. Valve 26 is then opened to back flush the porous screen 58 with pressurized water through line 23; valves 43 and 56 are opened to supply pressurized water flow to tangential flush lines 42 and 55 respectively, and valve 51 or 52 is opened to supply pressurized cold or hot water to rotating spray nozzle 64 via line 62. After the flow of liquid exiting the waste line 21 is observed to be clear and clean, the valves supplying pressurized water to the various lines for flush out are closed; valve 22 on waste line 21 is closed, and the process is complete. The extract exit line 27, chiller 28, and extract collection line 29 can also be flushed by opening valve 25 followed by valve 26 to direct pressurized water from source 32 through line 31, valve 26, tee 24, valve 25, line 27, chiller 28, and line 29.

As discussed previously, the invention also provides methods for removing excess solvent from consumable extracts in order to concentrate the extracts with respect to a dissolved or suspended consumable material. It should be understood that the inventive filtration-based concentration methods described herein can be utilized for concentrating a wide variety of consumable extracts produced from extracting a wide variety of solid raw materials, such as those discussed previously in the context of the inventive extraction methods. It should also be understood that, while in some preferred embodiments, the inventive concentration methods are utilized for concentrating extracts produced using the above-described inventive extraction methods and apparatuses, the novel concentration methods described herein can also, in other embodiments, be utilized for concentrating consumable extracts produced by a wide variety of other extraction methods for forming consumable extracts known in the prior art. As with the above-discussed extraction methods, the inventive extract concentration methods will be described below with reference to a particular embodiment involving the concentration of an aqueous extract of roasted coffee; however, it should be understood that the methods and apparatuses described herein are not so limited and that the methods and apparatuses may be employed with a wide variety of other consumable extracts produced by a wide variety of extraction methods within the scope of the present invention.

Figure 5:
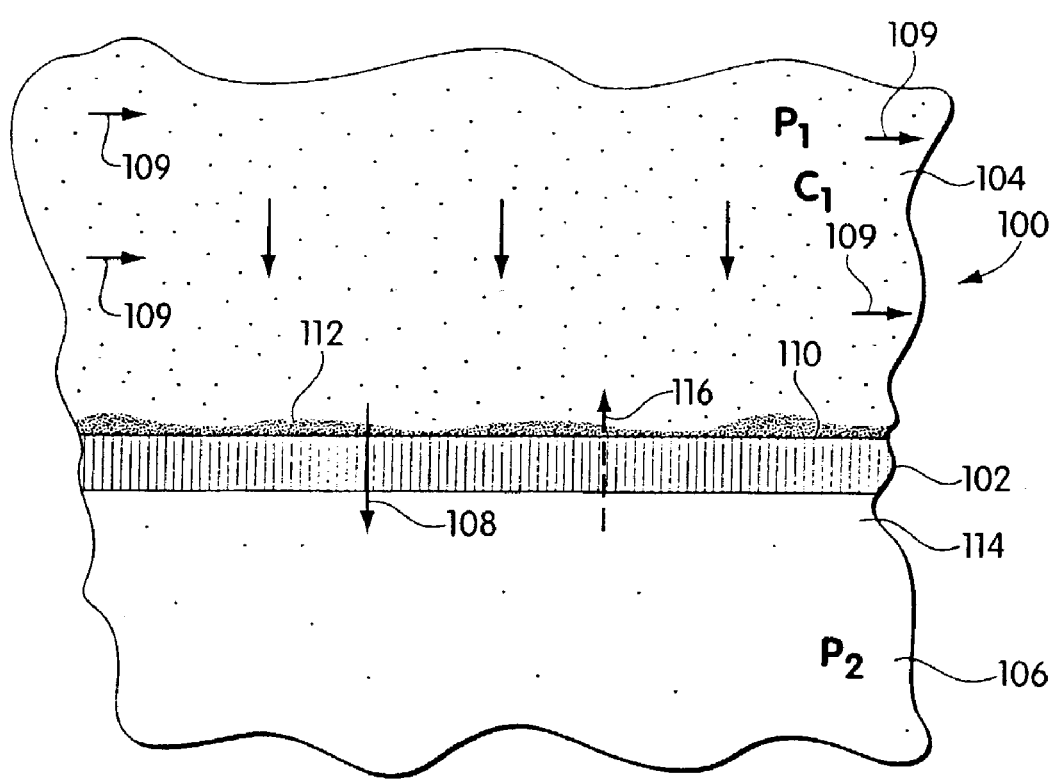
FIG. 5 is a schematic illustration of a portion of a filter system for concentrating a consumable extract, according to some embodiments of the invention.

FIG. 5 is a conceptual diagram of a portion of filtration-based system for concentrating a consumable extract, for example a coffee extract as produced by the extraction methods described above. FIG. 5 shows a section of a filter 100 including a filter medium 102, which separates the filter into a retentate side 104 and a permeate side 106. The term "filter" as used herein refers broadly to any apparatus or system containing a filtration medium and able to perform filtration of a liquid. The term "filtration medium" as used herein refers to any medium, material, or object having sufficient hydraulic permeability to allow at least one component, for example a solvent, of a liquid solution or suspension, for example a coffee extract, to pass through the medium, while, at the same time, retaining and preventing passage of at least one other component of the solution or suspension, for example a dissolved solute component. A wide variety of filters and filter media may be used, according to the invention, for concentrating consumable extracts, for example coffee extracts.

Filters that may be utilized according to the invention can include a wide variety of configurations as known in the art, for examples, gel permeation filters, and membrane-based filters in a wide variety of configurations, such as flat sheet filters, hollow fiber filters, spiral filters, tube membrane filters, and other configurations as apparent to those of ordinary skill in the art. Preferred filters employ a filtration medium comprising a semipermeable membrane(s). Such membranes can be fabricated from a wide variety of materials, such as ceramics and other inorganic materials, or organic materials, such as polymers. Certain preferred embodiments of the invention utilize a filtration medium comprising a semipermeable polymeric membrane(s). Such polymeric membranes can be fabricated from a wide variety of polymeric materials and can be constructed to have a wide variety of porosity and molecular size exclusion characteristics. Such membranes are well known in the filtration arts, and are widely commercially available. Polymeric membranes can potentially be constructed, for example, from polymers including, but not limited to, polyamides, cellulose and/or cellulose esters, polysulfone, polycarbonate, polyesters, polyethylene oxide, polypropylene oxide, polyvinylidene fluoride, poly(tetrafluoroethylene), poly(acrylates), others, and in co-polymers and/or combinations as known in the filtration and membrane separation arts.

Referring to FIG. 5, the basic steps of the inventive concentration method can involve supplying an extract to be concentrated to the retentate side 104 of filter 100, passing a permeate comprising at least a portion of the solvent component of the extract through filtration medium 102, as shown by arrow 108, and collecting the concentrated and solvent-reduced extract from the retentate side 104 of the filter, and, optionally, collecting the permeate from the permeate side 106 of the filter. Filter 100 may, in some embodiments, be operated in a dead-end mode, with essentially no flow or very little flow of retentate directed tangential to filter medium 102, or, in more preferred embodiments, the filter can be operated in a cross-flow mode as shown, with a component of retentate flow (arrows 109) directed tangentially to the filtration medium, in order to prevent fouling and increase the filtration efficiency of the filter.

Filter medium 102 is preferably selected to have a porosity and molecular weight cutoff able to allow passage of a solvent component of the extract, for example water, while retaining on the retentate side of the filter dissolved or suspended solutes which form flavor and/or fragrance components of the extract. For embodiments where the method is used for de-watering a coffee extract, filter membrane 102 is preferably selected so that it is able to freely pass water, while, at the same time, retaining, on the retentate side, a substantial fraction of the dissolved coffee solids in the extract. A "substantial fraction" as used herein in the present context refers to a fraction of coffee solids that is necessary to impart to the retained extract an "effective amount" of varietal components, as defined previously. In some preferred embodiments, at least 90% of the coffee solids are retained, and in even more preferred embodiments, essentially all of the dissolved solids comprising flavor and/or fragrance components are retained on the retentate side of the filter by the filtration membrane. For preferred embodiments involving de-watering of coffee extracts, the filtration membrane 102 comprises a reverse osmosis membrane or a nanofiltration membrane. A "reverse osmosis membrane" as used herein refers to a membrane having an average pore size of less than about 0.003 μm and a molecular weight cutoff of less than about 1,000 Da. A "nanofiltration membrane" as used herein refers to a membrane having an average pore size within the range of between about 0.001 μm and about 0.01 μm, with a molecular weight cutoff within the range of between about 300 Da and about 20,000 Da. In one preferred embodiment, filter membrane 102 comprises a polyamide nanofiltration membrane, in another preferred embodiment, the filter membrane comprises a spiral-wound, multi-layer, thin film composite reverse osmosis membrane such as FILMTEC® reverse osmosis membranes available from The Dow Chemical Company.

The concentration method, according to the invention, for forming a concentrated coffee extract via de-watering a more dilute precursor extract can proceed by supplying the relatively dilute coffee extract to the retentate side 104 of filter 100 at a pressure $P_1$ sufficiently in excess of pressure $P_2$ on permeate side 106 of the filter to force solvent through membrane 102 while retaining a substantial fraction of coffee solvents on retentate side 104, and, thus, increasing the concentration $c_1$ of dissolved coffee solids in the retentate above that of the concentration in the precursor coffee extract. The filtration process can be continued until a desired concentration $c_1$ is achieved. The system can be monitored by, for example, measuring the volume of permeate collected from permeate side 106 of the filter and comparing the volume of permeate collected to the initial volume of coffee extract before commencement of the filtration process and/or by measuring the conductivity of the retentate and determining the dissolved solids concentration by comparison with a calibration curve. For example, for embodiments where it is desired to reduce the volume of solvent in the initial coffee extract by a factor of 2, and thus increase the concentration of coffee solids in the concentrated extract by approximately a factor of 2, the filtration process can be continued until a volume of permeate approximately equal to one half the initial volume of extract supplied to the retentate side of the filter is collected.

The filter size, for example as measured by the total area of the planar surface 110 of membrane 102 available for filtration, the applied differential pressure ($P_2-P_1$), flow rates, and other operating parameters of the filter, as well as the molecular weight cutoff and pore size of the filter membrane, must be selected according to the needs of each particular desired application. The selection of such operating parameters can be based upon the total volume of extract desired to be concentrated within a particular time period, the concentration and size of the dissolved and/or suspended components in the extract which are desired to be retained, the particular configuration of the filter, and other factors as apparent to those of ordinary skill in the filtration arts, and as described, for example in many standard texts such as *Perry's Chemical Engineers' Handbook* (Sixth Edition, Robert H. Perry, Don W. Green, and James O. Maloney, Eds., 1984, Chapter 17), incorporated herein by reference. As described below with reference to FIGS. 6-8, many filtration systems for performing reverse osmosis or nanofiltration are commercially available and are sized and designed for processing a wide variety and quantities of liquid solutions/suspensions.

The particular selection of operating parameters must be made, for a particular application, by routine experimentation and optimization. For example, screening tests may be performed for selecting appropriate types of filtration membranes and molecular weight cutoffs by performing a trial filtration of a dilute, for example beverage strength, coffee extract with a particular membrane until a desired degree of de-watering is obtained, followed by collecting the concentrated extract from the retentate side of the filter, reconstituting the concentrated extract with a volume of fresh solvent water equal to the volume of permeate removed during filtration, and comparing the taste and/or flavor characteristics of the reconstituted extract to that of the initial, beverage-strength extract, for example by cupping as described previously. Operating pressures, filter sizes, flow rates, and other operating parameters may be selected on the basis of well known principles of membrane filtration/separations, described in many well known and readily available texts describing filtration/reverse osmosis, for example in *Perry's Chemical Engineers' Handbook* referenced above and McCabe, Smith, and Harriott, *Unit Operations of Chemical Engineering*, Fourth Edition, Kiran Verma and Madelaine Eichberg, Eds., 1985, incorporated herein by reference, combined with routine experimentation and optimization. Typically, for a given filtration membrane, having a molecular weight cutoff and porosity selected as described above, the total membrane area is selected to provide a desired range of permeate throughput (i.e., volume filtered/time) within an acceptable range of differential pressure, as dictated by the material limitations of the filtration medium and filter system components.

As shown in FIG. 5, upon filtration of a coffee extract to form a more concentrated coffee extract, over time, a layer of coffee solids 112 may have a tendency to build up on the retentate side 110 of filter membrane 102. This can be undesirable from the standpoint both of decreasing the filtration rate through membrane 102 at a given differential pressure, and from the standpoint of a loss of coffee solid concentration $c_1$ in the retentate collected from retentate side 104 of the filter. In some preferred embodiments, at one or more points during the filtration process, membrane 102 can be back-flushed by supplying, for a brief period, a relatively small volume of a back-flush solvent (which, in some embodiments, may comprise permeate collected during the filtration process) to the permeate side 114 of membrane 102, and forcing the back-flush solvent through membrane 102 from permeate side 106 of the filter to retentate side 104 of the filter, in the direction of arrow 116, by creating a pressure $P_2$ on the permeate side exceeding pressure $P_1$ on the retentate side of the filter. In this way, coffee solids forming a layer 112 on membrane 102 can be dislodged from the membrane to improve its overall filtration rate, upon subsequent filtration, and also to re-suspend coffee solids 112 in the concentrated coffee extract present on retentate side 104 of the filter. Thus, using such a back-flush procedure can increase the total recovery of, and concentration of, coffee solids in the de-watered extract, which can lead to formation of a more valuable de-watered extract product with enhanced retention of the flavor/fragrance characteristics of the initial precursor coffee extract before concentration. It is also contemplated that the permeate collected from permeate side 106 of the filter during the de-watering of coffee extract can, in certain embodiments, contain commercially valuable components, for example caffeine. For such embodiments, this permeate may be collected and utilized as a component or ingredient in other food or pharmaceutical products.

Figure 6:
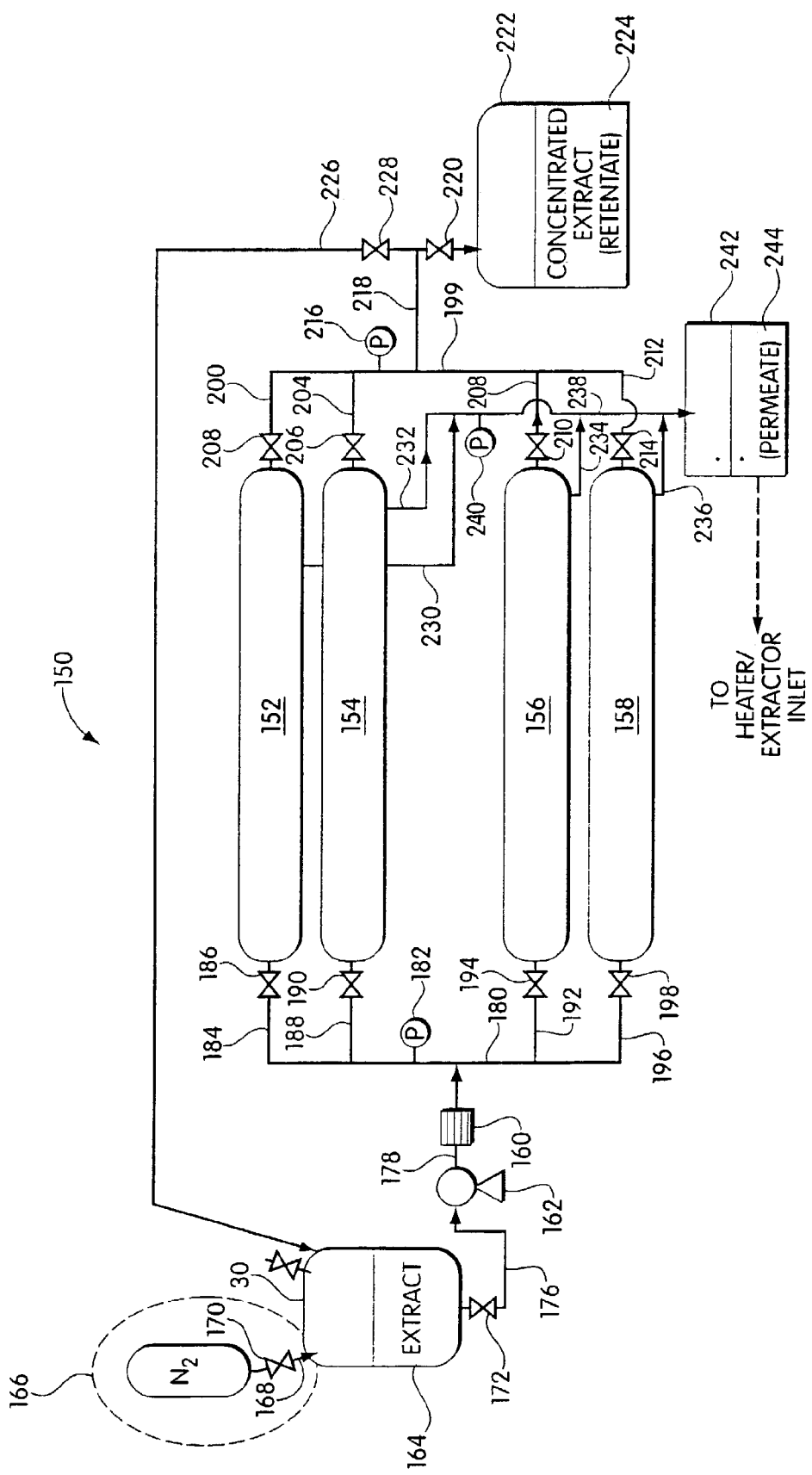
FIG. 6 is a schematic process flow diagram of a filtration-based extract concentration system, according to one embodiment of the invention

One illustrative embodiment of a filtration system for use, according to the invention for de-watering and concentrating a coffee extract is shown in FIG. 6. Filtration system 150, as shown, is representative of a variety of commercially available reverse osmosis/nanofiltration systems available, for example, from the PROSYS Corporation (Chelmsford, Mass.). In one particular embodiment of the invention, filtration system 150 comprises a modified PROSYS Model No. 400 Series Reverse Osmosis System having a nominal design permeate flow rate of 1 gal./min. The system, as configured in the illustrated embodiment, is constructed from food/pharmaceutical grade materials. The system may further include, in some embodiments, a variety of additional valves, switches, pressure gauges, transducers, temperature probes, electronic/microprocessor-based monitoring/process control hardware and software, etc., in addition to the particular components illustrated, as would be apparent to those of ordinary skill in the reverse osmosis/nanofiltration arts. System 150, as configured in the illustrated embodiment, includes four filtration cartridges 152, 154, 156, and 158, which are arranged in a parallel configuration. Each of the filter cartridges, as illustrated, includes a Model No. TFCO-4921S Spiral-Wound Filter Cartridge (Koch Membrane Systems, Wilmington, Mass.). The filtration cartridges each include about 7.5 $m^2$ of filter membrane area. The filter membrane is configured in a spiral-wound fashion with a fiberglass outerwrap, and the semi-permeable membrane comprises a polyamide membrane of the nanofiltration type. The maximum operating pressure for the membrane cartridges is about 350 psi with a typical operating pressure of about 80 psi. System 150 further includes a 5 µm cartridge prefilter 160 upstream of filter cartridges 152, 154, 156, and 158. In the illustrated embodiment, extract is pressurized and supplied to the filter cartridges by means of a pump 162, which, in the illustrated embodiment, comprises a multi-stage centrifugal pump with stainless steel wetted components. In other embodiments, pump 162 may be supplemented or replaced by a system for pressurizing the container/vessel 30 holding extract 164 to be concentrated. In one preferred embodiment, such an extract pressurization system can comprise a source of compressed gas 166 coupled to container 30 via line 168 and valve 170, which is configured to supply compressed gas at a sufficient pressure for driving extract through filtration system 150. For embodiments where extract 164 is pressurized with an external source of pressurized gas, it is preferred that the pressurized gas comprise an inert gas, for example nitrogen. In preferred embodiments, extract 164 in container 30 is maintained in contact with and blanketed by an inert gas supplied be source 166 during processing in order to minimize its exposure to oxygen. The inert gas from source 166 can also, in some embodiments, be used at the end of processing, after collection of the concentrated extract product from the system, to "blow out" residual retentate from the lines of the system and the filtration cartridges for collection.

System 150 can operate as follows for de-watering and concentrating a coffee extract, according to the invention. Unconcentrated extract 164 in container 30 can be produced, for example, as described above by utilizing the inventive extraction methods and apparatuses. "Unconcentrated" extract as used herein refers specifically to an extract forming a feed stream to the retentate side of the filters contained within the system. It should be understood that such "unconcentrated" extracts will, in many cases, already, as produced from the inventive extraction methods and apparatus, have a level of coffee solids concentration exceeding that typical for typical beverage-strength extracts. Conversely, a "concentrated" extract, as used in the following description, refers to an extract comprising a water-reduced (i.e. de-watered) retentate product recovered from the retentate side of the filters contained within the system. As described previously, in some preferred embodiments, unconcentrated extract 164 can comprise an extract produced from a second or subsequent extraction step of a given charge of roasted coffee. For embodiments where extract 164 is produced from a second or subsequent extraction step of a given charge of roasted coffee, typically, the concentration of coffee solids in the extract will be lower, and the degree of dilution with water will be higher, than for extracts produced during the first-pass extraction of the roasted coffee. It is, therefore, sometimes desirable to concentrate the second, or subsequent pass extract so that it has a concentration of coffee solids and degree of dilution that is similar to that of the first-pass extract. In this way, as described in more detail below, the extracts produced according to the invention during the first-pass extraction may be blended with extracts produced during a second or subsequent stage extraction, which have been de-watered to have an overall concentration similar to that of the first-pass extract, to form blended coffee extracts without substantially diluting the overall concentration of coffee solids in the first-pass extract.

Extract 164 can be fed, for example by gravity, through valve 172 and line 176 to pump 162 where it is pressurized to the operating pressure of filtration cartridges 152, 154, 156, and 158. The extract then passes from pump 162 through line 178 and through pre-filter 160 to manifold 180 including a pressure gauge or transducer 182 thereon for monitoring the retentate side pressure of filtration cartridges 152, 154, 156, and 158. In other embodiments, additional pressure gauges/transducers may be located directly on the individual filtration cartridges 152, 154, 156, and 158. In addition, while in the illustrated embodiment filtration cartridges 152, 154, 156, and 158 are connected in parallel to a manifold 180, in other embodiments, the filtration cartridges may instead be connected in series with respect to each other. From manifold 180, extract 164 passes through each of filtration cartridges 152, 154, 156, and 158 via line 184 and valve 186, line 188 and valve 190, line 192 and valve 194, and line 196 and valve 198 respectively. Unconcentrated extract 164 is fed to the retentate side of the filter cartridges. While flowing through the retentate side of the filter cartridges, at least a portion of the solvent component of the extract passes through the filtration membrane to the permeate side of the filtration cartridges, thus forming a more concentrated coffee extract on the retentate side of the filter cartridges and a relatively dilute or coffee solid free permeate on the permeate side of the filter cartridges. The concentrated coffee extract retentate then flows out of the filter cartridges and into a concentrated extract manifold 199 via line 200 and valve 202, line 204 and valve 206, line 208 and valve 210, and line 212 and valve 214 for filtration cartridges 152, 154, 156, and 158 respectively. Concentrated extract manifold 199 may include a pressure gauge/transducer 216 thereon for monitoring the pressure on the retentate sides of the filter cartridges. The concentrated coffee extract in manifold 199 flows via line 218 and valve 220 to collection container 222, for containing concentrated extract 224.

In some preferred embodiments for operating filtration system 150, unconcentrated extract 164 passes through filtration cartridges 152, 154, 156, and 158 only single time to form concentrated extract 224 in a single-pass through the system. In other embodiments, system 150 may be operated as a multi-pass system, where, in such embodiments, the concentrated extract is recycled back to container 30 via line 226 and valve 228. For such embodiments, extract would continue to be pumped from container 30, through the filter cartridges, and recycled to container 30 until a desired quantity of solvent has been removed, as permeate, and a desired level of concentration of the extract contained in container 30 has been achieved.

Permeate is collected from the filter cartridges via lines 230, 232, 234, and 236 and flows into manifold 238, which can have a pressure gauge/transducer 240 thereon, and into permeate collection container 242. As previously discussed, permeate 244 may be saved and utilized as an ingredient for additional food/pharmaceutical products or, may be discarded. In another preferred embodiment, especially where the solvent water comprising permeate 244 has been substantially demineralized by passage through filtration cartridges 152, 154, 156, and 158, aqueous permeate 244 can be beneficially used as an extraction solvent for performing an extraction of fresh, or previously extracted, roasted coffee, and, for such purposes, may be recycled back to line 46 on extraction system 10, as shown previously in FIGS. 1 and 2. The amount of permeate removed form the extract during concentration procedure depends, as previously discussed, on the desired final concentration of the concentrated extract. For some preferred embodiments involving a single-pass operating mode, and where a highly concentrated extract is desired, at least about 50% of the solvent component of the extract supplied to the retentate side of the filter cartridges is passed to the permeate side of the filter cartridges, or, for multipass/multicycle embodiments, at least 50% of the solvent component of the initial precursor unconcentrated extract is removed by the system during the multipass filtration procedure. Also, as discussed previously, for some embodiments, filtration cartridges 152, 154, 156, and 158 may be briefly back-pulsed or back-flushed, for example by reversing pump 162 and/or supplying a pressurized quantity of permeate or other back-flush solvent to manifold 238. For such embodiments, the filtration media in the filtration cartridges may be at least partially cleaned and regenerated, and additional coffee solids may be collected from the retentate side of the filter cartridges for addition to concentrated extract 224 during the back-flush procedure.

Figure 7:
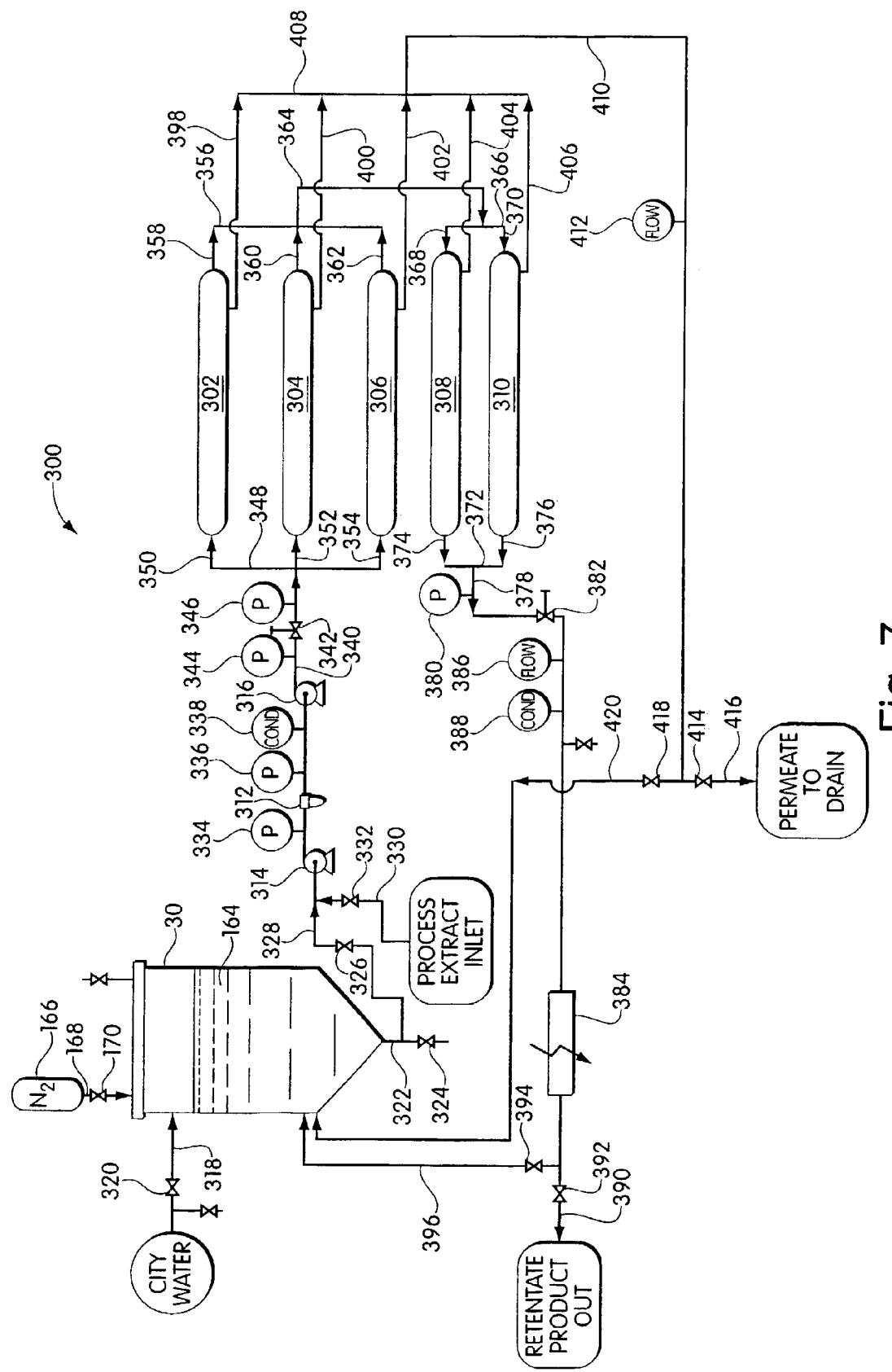
FIG. 7 is a schematic process flow diagram of a filtration-based extract concentration system, according to another embodiment of the invention

A second illustrative embodiment of a filtration system for use, according to the invention for de-watering and concentrating a coffee extract is shown in FIG. 7. Filtration system 300, in one particular embodiment of the invention, comprises a modified Fluid Solutions Model No. 10037 Reverse Osmosis System (Fluid Solutions, Inc. Lowell, Mass.) having a nominal design permeate flow rate of about 12-15 gal./min. The system, as configured in the illustrated embodiment, is constructed from food/pharmaceutical grade materials. The system may further include, in some embodiments, a variety of additional valves, switches, pressure gauges, transducers, temperature probes, electronic/microprocessor-based monitoring/process control hardware and software, etc., in addition to the particular components illustrated, as would be apparent to those of ordinary skill in the reverse osmosis/nanofiltration arts. System 300, as configured in the illustrated embodiment, includes five filtration cartridges 302, 304, 306, 308, and 310. Cartridges 302, 304, and 306 are arranged in parallel and are connected in series with cartridges 308 and 310, which are connected in parallel with each other. Each of the filter cartridges, as illustrated, includes three FILMTEC® Model No. BW30-4040 spiral-wound filter membrane elements. The filter membrane elements each include about 6.5 m² of filter membrane area. The maximum operating pressure for the filter membrane elements is about 600 psi with a typical operating pressure of between about 250-400 psi. System 300 further includes a 5 µm cartridge prefilter 312 upstream of filter cartridges 302-310. In the illustrated embodiment, extract is pressurized and supplied to the filter cartridges by means of booster pump 314 and R/O pump 316. In other embodiments, pump 314 and/or 316 may be supplemented or replaced by a system for pressurizing the container/vessel 30 holding extract 164 to be concentrated. In one preferred embodiment, such an extract pressurization system can comprise a source of compressed gas 166 coupled to container 30 via line 168 and valve 170, which is configured to supply compressed gas at a sufficient pressure for driving extract through filtration system 300. For embodiments where extract 164 is pressurized with an external source of pressurized gas, it is preferred that the pressurized gas comprise an inert gas, for example nitrogen. Container 30, as illustrated, also includes an inlet line 318, connected to a city water supply via valve 320 and an outlet line 322 for draining the container through valve 324. In preferred embodiments, extract 164 in container 30 is maintained in contact with and blanketed by an inert gas supplied be source 166 during processing in order to minimize its exposure to oxygen. The inert gas from source 166 can also, in some embodiments, be used at the end of processing, after collection of the concentrated extract product from the system, to "blow out" residual retentate from the lines of the system and the filtration cartridges for collection.

System 300 can operate as follows for de-watering and concentrating a coffee extract, according to the invention. Unconcentrated extract 164 in container 30 can be produced, for example, as described above by utilizing the inventive extraction methods and apparatuses. Extract 164 can be fed, for example by gravity, through valve 326 and line 328 to booster pump 314. Alternatively, or concurrently, extract can be fed to the system directly from the outlet line of the extractor via line 330 and valve 332. The extract is pressurized by booster pump to a pressure, measured by pressure gauge 334, sufficient to pass the extract through the prefilter 312. Pressure drop across the prefilter can be determined by comparison of the pressure measured downstream of the prefilter by pressure gauge 336 to that measured upstream by gauge 334. A conductivity meter 338 is included to enable the determination of the concentration of solids in the extract prior to de-watering in cartridges 302, 304, 306, 308, and 310, as previously discussed.

The extract is then pressurized to the operating pressure of filtration cartridges 302, 304, 306, 308, and 310 by R/O pump 316. The extract then passes from pump 316 through line 340 and through throttling valve 342, including located upstream and downstream thereof pressure gauges 344 and 346 respectively, to manifold 348. In other embodiments, pressure gauges/transducers may be located on the manifold or directly on the individual filtration cartridges 302, 304, and 306. From manifold 348, extract 164 passes through each of filtration cartridges 302, 304, and 306 via line 350, line 352, and line 354 respectively. Unconcentrated extract 164 is fed to the retentate side of the filter cartridges. While flowing through the retentate side of the filter cartridges, at least a portion of the solvent component of the extract passes through the filtration membrane to the permeate side of the filtration cartridges, thus forming a more concentrated coffee extract on the retentate side of the filter cartridges and a relatively dilute or coffee solid free permeate on the permeate side of the filter cartridges. The concentrated coffee extract retentate then flows out of the filter cartridges and into a concentrated extract manifold 356 via line 358, line 360, and line 362 for filtration cartridges 302, 304, and 306 respectively. The concentrated coffee extract in manifold 356 flows via line 364 to inlet manifold 366 which feeds filter cartridges 308 and 310 via lines 368 and 370 respectively. The extract is then further concentrated by filter cartridges 308 and 310 to produce a concentrated a coffee extract retentate which flows out of the filter cartridges 308 and 310 into a concentrated extract manifold 372 via lines 374 and 376. The concentrated extract then flows via line, including pressure gauge 380 thereon, through throttling valve 382 to chiller 384. Included on line 378 downstream of throttling valve 382 is a flow meter 386 for measuring volumetric fluid flow of the retentate and a conductivity meter 388 for determination of solids content of the concentrated extract. If the solids concentration of the retentate stream, as determined from the conductivity measurement or otherwise, meets the desired product value, then the concentrated extract can be collected as final product from line 390 by opening valve 392; otherwise, the extract can be recycled to tank 30 via opening valve 394 on line 396 for further processing.

Permeate is collected from the filter cartridges via lines 398, 400, 402, and 404 and flows into manifold 408. Manifold 408, in turn, feeds permeate line 410, which has a flow meter 412 thereon. Permeate can either be sent to drain or collection via opening valve 414 on line, or, if desired, recycled to tank 30 via opening valve 418 on line 420. As discussed previously, for some embodiments, filtration cartridges 302, 304, 304, 306, 308, 310 may be briefly back-pulsed or back-flushed, for example by reversing pump 316 and/or supplying a pressurized quantity of permeate or other back-flush solvent to manifold 408. For such embodiments, the filtration media in the filtration cartridges may be at least partially cleaned and regenerated, and additional coffee solids may be collected from the retentate side of the filter cartridges for addition to the product concentrated extract during the back-flush procedure.

Figure 8:
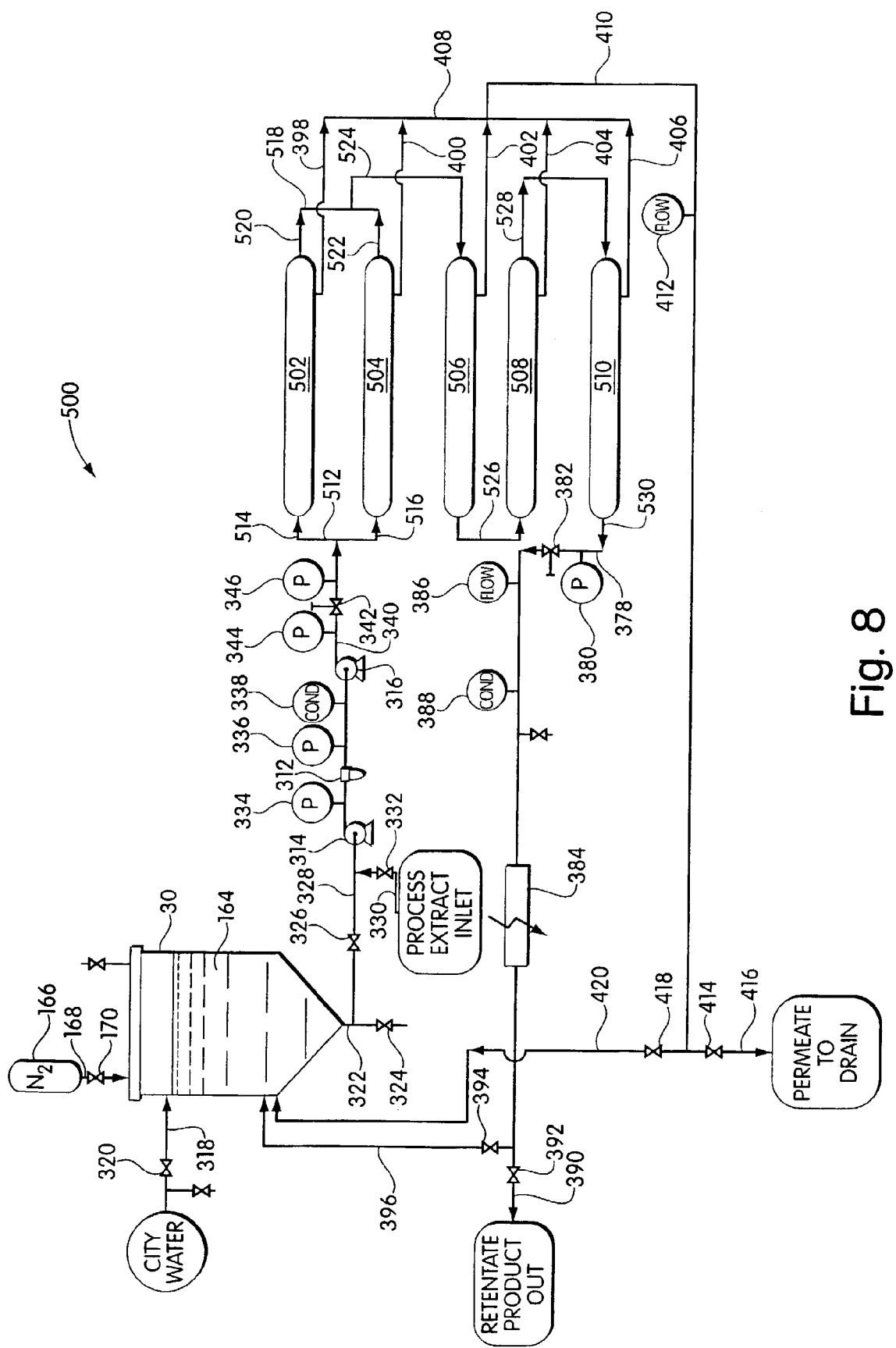
FIG. 8 is a schematic process flow diagram of a filtration-based extract concentration system, according to another embodiment of the invention.

A third illustrative embodiment of a filtration system for use, according to the invention for de-watering and concentrating a coffee extract is shown in FIG. 8. Filtration system 500, is similar in construction and operation to system 300 illustrated previously in FIG. 7, except for the size and capacity of the system and the arrangement of the filter cartridges. Components of system 500 that are similar in design and function to corresponding components of system 300 discussed previously (although potentially differing in size and design so as to accommodate the larger size and capacity of system 500, as would be apparent to those of ordinary skill in the art) are given the same figure labels as in FIG. 7 and are not separately discussed herein. Filtration system 500 in one particular embodiment of the invention, comprises a modified Fluid Solutions Model No. FSRO-600-10VS Reverse Osmosis System (Fluid Solutions, Inc. Lowell, Mass.) having a nominal design permeate flow rate of about 30-40 gal./min. The system, as configured in the illustrated embodiment, is constructed from food/pharmaceutical grade materials. The system may further include, in some embodiments, a variety of additional valves, switches, pressure gauges, transducers, temperature probes, electronic/microprocessor-based monitoring/process control hardware and software, etc., in addition to the particular components illustrated, as would be apparent to those of ordinary skill in the reverse osmosis/ nanofiltration arts. System 500, as configured in the illustrated embodiment, includes five filtration cartridges 502, 504, 506, 508, and 510. Cartridges 502, and 504 are arranged in parallel and are connected in series with cartridges 506, 508 and 510, which are connected in series with each other. Parallel cartridges 502 and 504 are fed by inlet manifold 512 connected to cartridges 502 and 504 via lines 514 and 516 respectively. Retentate output from cartridges 502 and 504 flows into outlet manifold 518 via lines 520 and 522 respectively, and flows from manifold 518 to cartridge 506 via line 524. Retentate output from cartridge 506 is fed to cartridge 508 via line 526, and retentate from cartridge 508 is fed to cartridge 510 via line 528. The concentrated retentate, produced by final filtration cartridge 510 flows from the cartridge for collection or recycle via line 530. Each of the filtration cartridges, 502, 504, 506, 508, and 510 as illustrated, includes two FILMTEC® Model No. SW30-8040 spiral-wound filter membrane elements. The filter membrane elements each include about 28 m² of filter membrane area. The maximum operating pressure for the filter membrane elements is about 1015 psi with a typical operating pressure of between about 600-900 psi.

As discussed previously, the inventive solvent reduction and de-watering methods for forming concentrated consumable extracts, for example coffee extracts, provide a variety of beneficial features and advantages to the inventive extract producing methods and systems. For example, in some embodiments involving the production of coffee extracts, a de-watering process such as that described above in reference to FIG. 6 can be used to concentrate and de-water the coffee extracts produced by the inventive extraction methods, previously described, to form even more highly concentrated coffee extracts, for example containing at least about 6% wt. coffee solids, in some embodiments at least about 10% wt. coffee solids, in some embodiments at least about 12% wt. coffee solids, in some embodiments at least about 15% wt. coffee solids, in some embodiments at least about 20% wt. coffee solids, in some embodiments at least about 25% wt. coffee solids, in some embodiments at least about 30% wt. coffee solids and in some embodiments containing at least about 40% wt. coffee solids. Furthermore, the highly concentrated extracts produced by the inventive extraction and dewatering methods described herein can advantageously retain an effective amount of the varietal flavor and fragrance components of the roasted coffee from which they are prepared. Such highly concentrated extracts can be advantageously used for applications requiring low-water coffee flavoring products. One such application involves the use of the inventive highly concentrated coffee extracts as a flavoring ingredient for the production of coffee ice cream, where excessive water can lead to detrimental icing and texture degradation of the final ice cream product. In addition, concentration and de-watering of coffee extracts by the inventive concentration methods described herein can advantageously provide concentrated coffee extract products having a given quantity of coffee solids contained therein, including an effective amount of varietal flavor and fragrance components, which have a relatively low total product weight and volume. For example, by increasing the concentration of an extract by a factor of 2, for a given quantity of coffee fragrance and flavor (proportional to the amount of coffee solids present) the volume of a coffee extract product can similarly be reduced by a factor of 2 and the weight of the product can be reduced by nearly this amount, thus saving substantial shipping and packaging costs, similarly for even higher levels of concentration able to be obtained by practicing the current invention, for example increases in concentration by a factor of 5, 10, 20, 30, 40, 50, or 60, even greater reduction in shipping, packaging and storage costs can be realized.

Also, as discussed above, the inventive extraction and concentration methods allow for the formation of concentrated coffee extracts having a variety of different fragrance and flavor characteristics to be produced by extracting a given charge of roasted coffee. The nature of the inventive extraction processes described herein is that the less water that is used for a coffee extraction, the higher will tend to be the concentration level of coffee solids in the extract produced, but also, the more flavor and extractable coffee solids will tend to be left behind in the non-exhaustively extracted grinds remaining in the extractor. Using the inventive concentration method, a first-pass, high concentration coffee extract can be produced by extracting a fresh charge of roasted coffee with a relatively small quantity of water and set aside as an "extra virgin" coffee concentrate. The roasted coffee in the extractor may then be subjected to one or more additional extraction cycles utilizing an increased amount of water during the extraction in order to more exhaustively extract the roasted coffee and improve extraction efficiency. The extracts obtained from these secondary and subsequent extraction cycles can then be de-watered using the inventive concentration methods described above to have, in some embodiments, an overall coffee solids concentration similar to that of the "extra virgin" concentrate. The "extra virgin" concentrate and the de-watered concentrates produced from subsequent extraction cycles can then be blended to form an extract having a balance of relatively sweet flavor/fragrance attributes imparted by the "extra virgin" extract and more bitter/acidic flavor/fragrance attributes imparted by the extracts produced by secondary or subsequent extractions of the roasted coffee. These blended extracts often have an overall flavor/fragrance more typical of beverage quality coffee produced by many prior art coffee beverage making methods. Such a combined extract may then be used as a flavoring agent, or may be reconstituted by dilution with water to a final dissolved coffee solid concentration typical of a beverage strength extract, for example containing between about 1% wt. dissolved coffee solids and about 4% wt. coffee solids, to produce a flavorful and well balanced coffee beverage therefrom. The particular balance between sweetness and bitterness/acidity can be readily adjusted, as desired, for example by adjusting the relative proportions of "extra virgin" extract and extracts produced by subsequent extraction and concentration in the blended extract. For embodiments where the overall coffee solids concentration of the "extra virgin" extracts and of the extracts produced by subsequent extraction of the roasted coffee, followed by concentration of the extract by de-watering, is about the same, where a richer, sweeter extract/beverage is desired, the amount of the "extra virgin" extract added to the blend should be greater than the amount of extract produced by subsequent extraction and concentration, for embodiments where a tarter, more bitter extract/beverage is desired, the amount of the "extra virgin" extract added to the blend should be less than the amount of extract produced by subsequent extraction and concentration, and for embodiments where a more evenly balanced extract/beverage is desired, the amount of the "extra virgin" extract added to the blend should be about equal to the amount of extract produced by subsequent extraction and concentration.

In general, the inventive extraction and de-watering methods provide a wide range of flexibility for producing "extra virgin" extracts and other extracts produced by more thorough extraction of a roasted coffee, each having a high level of concentration of dissolved coffee solids, for example at least about 6% wt. dissolved coffee solids, which may be combined in a variety of proportions to produce extracts having customized flavor/fragrance profiles, or which may be sold separately to different markets.

Alternatively, in other embodiments, a single charge of roasted coffee can be exhaustively extracted in a single extraction to produce a beverage strength or lower than beverage strength extract having flavor characteristics typical of conventionally brewed coffees, and this extract can subsequently be de-watered and concentrated as described above to produce a concentrated extract having reduced volume and weight, which can subsequently be reconstituted with water to produce a coffee beverage having the same flavor characteristics typical of conventionally brewed coffees. Because the flavor, quality, and shelf-life of coffee extracts can be reduced by prolonged exposure to oxygen, in preferred embodiments of the invention, the exposure of the extract, during extraction, de-watering, and any subsequent handling, and packaging, to atmospheric air is minimized, for example by utilizing inert gases, such as nitrogen, as blanket/purge gases for contacting the extract during production and processing, as described previously.

The function and advantage of the invention will be more fully understood from the examples below. The following examples are intended to illustrate the operation of the invention, but not to exemplify the full scope of the invention.

EXAMPLE 1

One Pass Extraction without Subsequent De-Watering

The industrial scale extractor described in connection with FIGS. 1-4 was used to produce a coffee extract using the methods described in the preceding sections with the modifications indicated below. Approximately 265 lbs. of a blend of Costa Rican, Colombian, and Sumatran coffee beans, roasted to a medium dark finish, were ground using a Bunn coffee grinder (HVG, Bunn-o-matic, Springfield, Ill.) on a setting of 4.0. A Rotap sieve analysis indicated an 80% retention in Tyler sieves 12, 16, and 18, with the remaining 20% distributed across sieves 20, 30, 40, 45, and the bottom tray.

The vessel was filled with the dry ground coffee forming a bed and the system was wetted with hot water, from a supply maintained at 193 degrees F. and 90 psig, as described above. Valve 25 on the extract outlet line 23 was then closed and about 40 gallons of the hot water was added to the vessel via inlet line 46 yielding a final vessel pressure of about 90 psig. the vessel was then "burped" to remove excess air as previously described and then pressurized to about 120 psig with pressurized air. The coffee was "pressure-treated" at this pressure without flow for about 10 min., at which time, valve 25 was opened to allow the extract to flow from the vessel, through a stainless steel heat exchanger (chiller 28) operated to lower the temperature of the exiting extract from about 165 degrees to about 55 degrees F. in approximately 2 min., and into a collection container. When the pressure in the vessel dropped to about 90 psig, the hot water supply to the vessel was reestablished by opening valve 47 on aqueous solvent inlet line 46. An additional 90 gallons of hot water were then passed through the bed of coffee before closing valve 47. When no more extract was observed flowing from the vessel, pressurized air was supplied to the vessel at 120 psig to purge residual extract from the bed for collection. The total yield of extract was about 100 gallons from the 265 lb of dry coffee.

The extract was judged by taste and smell testing to have exceptional sweetness with a clear coffee flavor retaining the varietal components, and substantially free of acidic off-flavors. The extract had a Brix reading of about 8.0 (about 6.5% dissolved solubles) and can be reconstituted with about 7 lbs. water per pound of extract to yield a coffee beverage of normal drip brew strength, but with superior sweetness and flavor.

EXAMPLE 2

Two Pass Extraction with Subsequent De-Watering-of the Second-Pass Extract and Formation of a Blended Coffee Extract The industrial scale extractor described in connections with FIGS. 1-4 was used to produce a coffee extract using the methods described in the previous section with the modifications indicated below. Approximately 200 lbs. of Sumatran coffee beans were roasted and ground as described above in Example 1.

The extraction vessel was filled with the dry ground coffee and about 60 gallons of a first-pass coffee extract was produced as described previously for Example 1, except that in the present example pressurized nitrogen was utilized in place of the pressurized air in Example 1. Also, the step, in Example 1, of passing additional hot water through the bed of coffee performed immediately prior to the purging of residual extract from the bed with gas was omitted in the present example. The total yield of the first-pass extract was about 60 gallons from the 200 lbs. of dry coffee. This extract was set aside.

A second-pass extract was prepared, as described above, except using the same charge of ground coffee used previously for producing the first-pass extract, and except that after extract was collected from the vessel immediately subsequent to the pressure treat step and before purging residual extract from the bed with nitrogen, an additional of 60 gals. of hot water was passed through the bed of coffee in a similar fashion as that described above in Example 1. The total yield of second-pass extract was about 120 gals.

The second-pass extract was then de-watered using the PROSYS Model No. 400 Series Reverse Osmosis System (configured with four Model No. 4921S Koch nanofiltration membrane cartridges, arranged in parallel) described above in the context of FIG. 6. The system was operated in a multi-pass/recycle mode, as described above, wherein the extract was pumped through the filter elements in a cross-flow fashion, and the concentrated retentate was recycled to the extract supply container. The system was operated in this fashion until about 60 gals. of aqueous solvent was collected from the system as permeate. The resulting concentrated extract was then mixed in equal proportions with the first-pass extract produced above to yield a blended, concentrated coffee extract.

The blended extract was judged by taste and smell testing to have a clear coffee flavor that was well balanced with respect to sweet and bitter/acidic flavor components. The extract also was judged to retain the varietal components indicative of the Sumatran roasted coffee from which it was prepared. The extract had a Brix reading of about 8.0 (about 6.5% wt. dissolved solubles), and can be reconstituted with about 7 lbs. water per pound of extract to yield a coffee beverage of normal brew strength, and with well-balanced coffee flavor including desirable varietal flavor and fragrance components.

EXAMPLE 3

One Pass Extraction with Subsequent De-Watering to Produce a Highly Concentrated Coffee Extract An industrial scale extractor similar to that described in connection with FIGS. 1-4, except having a dome-shaped upper plate with a single, center-mounted raw material feed line and valve fed by a mechanical auger feed system. The industrial extractor utilized for the present example had an internal capacity of about 62.5 cubic feet, designed to extract about 1300 lbs. of ground, roasted coffee. About 1300 lbs. of the ground coffee described in example 2 was fed to the extractor, followed by closure of the valve on the raw material feed line.

The vessel was filled with the dry ground coffee forming a bed and the system was wetted with hot water, from a supply maintained at 193 degrees F. and 90 psig, as described above, except the first about 250 gallons of hot water added to the extractor were added through the bottom screen via line 23 and through tangential lines 42 and 55. At 250 gallons, the vent line was closed, and an additional about 50 gallons of hot water was added to the closed extractor via line 46 and water spray head 63, raising the internal pressure of the extractor to about 40-50 psig. The coffee was "pressure-treated" at this pressure without flow for about 30 min., at which time, valve 25 was controllably opened to allow the extract to flow from the vessel at a flow rate of about 6-8 gal./min., through a basket filter and stainless steel heat exchanger (chiller 28), which cooled the extract to a temperature of about 50 degrees F., and into a collection container. The hot water supply to the vessel was then reestablished at a controlled supply pressure of about 40 psig by opening valve 47 on aqueous solvent inlet line 46 and pumping hot water to the extractor at the above-mentioned pressure and at a controlled flow rate of about 6-8 gal./min., until an additional about 600 gallons of hot water were passed through the bed of coffee, at which point the flow was discontinued and valve 47 was closed. When no more extract was observed flowing from the vessel, pressurized nitrogen was supplied to the vessel to purge residual extract (about 100 gallons) from the bed for collection. The total yield of extract was about 1000 gallons from the 1300 lbs. of dry coffee.

The 1000 gallons of the above extract was then de-watered using the Fluid Solutions Model No. 10037 Reverse Osmosis System (configured with 15 FILMTEC Model No. BW30-4040 reverse osmosis membrane cartridges) described above in the context of FIG. 7. The system was operated in a multi-pass/recycle mode, as described above, wherein the extract was pumped through the filter elements in a cross-flow fashion, and the concentrated retentate was recycled to the extract supply container. The system was operated in this fashion until about 850 gals. of aqueous solvent was collected from the system as permeate.

The concentrated extract was judged by taste and smell testing to have a clear coffee flavor that was well balanced with respect to sweet and bitter/acidic flavor components. The extract also was judged to retain the varietal components indicative of the Sumatran roasted coffee from which it was prepared. The extract had a Brix reading of about 30 (about 25% wt. dissolved solubles), and can be reconstituted with about 30 lbs. water per pound of extract to yield a coffee beverage of normal brew strength, and with well-balanced coffee flavor including desirable varietal flavor and fragrance components.

While the invention has been shown and described above with reference to various embodiments and specific examples, it is to be understood that the invention is not limited to the embodiments or examples described and that the teachings of this invention may be practiced by one skilled in the art in various additional ways and for various additional purposes. Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems, or methods, provided that such features, systems, or methods are not mutually inconsistent, is included within the scope of the present invention.

What is claimed is:

1. A method for forming a concentrated coffee extract from a quantity of solid raw material consisting essentially of unground roasted coffee, said concentrated coffee extract having a flavor and fragrance of roasted coffee and suitable for reconstitution with water to form a coffee beverage, the method comprising acts of:

providing a quantity of a solid raw material consisting essentially of unground roasted coffee in a first state of fragmentation;

supplying a volume of a consumable liquid solvent to the quantity of solid raw material consisting essentially of unground roasted coffee;

extracting coffee solids from the solid raw material consisting essentially of unground roasted coffee by exposing the quantity of solid raw material consisting essentially of unground roasted coffee in said first state of fragmentation to the consumable liquid solvent at a temperature not exceeding the boiling point of water at atmospheric pressure, thereby forming a consumable coffee extract having the flavor and fragrance of roasted coffee comprising the consumable liquid solvent and dissolved coffee solids, wherein the dissolved coffee solids component of the coffee extract has been extracted from the quantity of solid raw material consisting essentially of unground roasted coffee while in said first state of fragmentation;

supplying a feed liquid consisting essentially of the coffee extract produced in the extracting act to a retentate side of a filter;

passing at least a portion of a consumable liquid solvent component of the coffee extract through a filtration medium to form a permeate comprising the portion of the consumable liquid solvent component on a permeate side of the filter while retaining at least a portion of the coffee solids on the retentate side of the filter, thereby forming on the retentate side of the filter said concentrated coffee extract having the flavor and fragrance of roasted coffee, said concentrated coffee extract being more concentrated in the coffee solids than said feed liquid, on the retentate side of the filter; and collecting said concentrated coffee extract having the flavor and fragrance of roasted coffee wherein said concentrated coffee extract having a flavor and fragrance of roasted coffee is suitable for reconstitution with water to form a coffee beverage.

2. The method as recited in claim 1, further comprising after the passing act:
collecting the permeate from the permeate side of the filter.

3. The method as recited in claim 2, further comprising:
forming a secondary extract with the collected permeate by flowing the collected permeate through a quantity of solid raw material.

4. The method as recited in claim 1, wherein the providing act further comprises acts of:
establishing a bed of the solid raw material consisting essentially of unground roasted coffee; and wherein the extracting act further comprises acts of:
pressurizing the consumable liquid solvent and bed to a selected and controllable pressure level;
maintaining the selected and controllable pressure level for a desired period of time under non-flow conditions; and
establishing a flow of the consumable coffee extract from the bed.

5. The method as recited in claim 1, wherein the filtration medium comprises at least one polymeric filtration membrane.

6. The method as recited in claim 5, wherein the filtration membrane comprises a reverse osmosis membrane.

7. The method as recited in claim 5, wherein the filtration membrane comprises a nanofiltration membrane.

8. The method as recited in claim 1, wherein at least during a portion of the passing act, an upstream pressure applied to the retentate side of the filter is maintained at a higher pressure than a downstream pressure applied to the permeate side of the filter.

9. The method as recited in claim 8, wherein the upstream pressure is created by pressurizing the feed liquid supplied to the retentate side of the filter in the supplying act.

10. The method as recited in claim 9, wherein the feed liquid is pressurized by pumping the feed liquid with a pump.

11. The method as recited in claim 9, wherein the feed liquid is pressurized with a compressed gas.

12. The method as recited in claim 11, wherein the gas is an inert gas.

13. The method as recited in claim 1, wherein during the passing act at least about 50% of the consumable liquid solvent component of the feed liquid supplied to the retentate side of the filter in the supplying act is passed to the permeate side of the filter.

14. The method as recited in claim 2, further comprising after the collecting act, an act of:
back-flushing the filtration medium with a consumable liquid back-flush solvent by supplying a quantity of the consumable liquid back-flush solvent to the permeate side of the filter; passing the consumable liquid back-flush solvent through the filtration medium to the retentate side of the filter, thereby dislodging at least a portion of any coffee solids forming a layer on a retentate side of the filter medium; and collecting the consumable liquid back-flush solvent together with any dislodged coffee solids from the retentate side of the filter.

15. The method as recited in claim 4, wherein the consumable liquid solvent comprises water.

16. A method for forming a concentrated consumable extract of a solid raw material, said concentrated consumable extract having a flavor and fragrance indicative of the solid raw material and suitable for reconstitution with water to form a beverage having a flavor and fragrance indicative of the solid raw material, comprising acts of:
providing a solid raw material;
supplying a volume of a consumable liquid solvent to the solid raw material;
pressurizing the consumable liquid solvent and solid raw material to a selected and controllable pressure level;
maintaining the selected and controllable pressure level for a desired period of time under non-flow conditions;
establishing a flow of a consumable extract having a flavor and fragrance indicative of the solid raw material from the solid raw material;
supplying the consumable extract having a flavor and fragrance indicative of the solid raw material to a retentate side of a filter;
passing at least a portion of a consumable liquid solvent component of the extract through a filtration medium to form a permeate comprising the portion of the consumable liquid solvent component on a permeate side of the filter while retaining at least a portion of a consumable material of the extract on the retentate side of the filter, thereby forming on the retentate side of the filter said concentrated consumable extract having a flavor and fragrance indicative of the solid raw material, concentrated consumable extract being more concentrated in the consumable material than the consumable extract supplied in the supplying act, on the retentate side of the filter; and
collecting said concentrated consumable extract having a flavor and fragrance indicative of the solid raw material, wherein said concentrated consumable extract having a flavor and fragrance indicative of the solid raw material is suitable for reconstitution with water to form a beverage having a flavor and fragrance indicative of the solid raw material.

17. The method as in claim 1, wherein the unground roasted coffee comprises whole bean coffee.

18. The method as in claim 1, further comprising an act of establishing a flow of the consumable coffee extract from the quantity of solid raw material consisting essentially of unground roasted coffee.

19. The method as in claim 4, wherein the pressure level maintained in the maintaining act is at least about 50 psig (344.7 kPa).

20. The method as in claim 19, wherein the pressure level maintained in the maintaining act is at least about 100 psig (689.4 kPa).

21. The method as in claim 16, wherein the pressure level maintained in the maintaining act is at least about 50 psig (344.7 kPa).

22. The method as in claim 21, wherein the pressure level maintained in the maintaining act is at least about 100 psig (689.4 kPa).

23. The method as in claim 16, wherein the solid raw material comprises roasted coffee.

24. The method as in claim 23, wherein the solid raw material comprises unground roasted coffee.

25. The method as in claim 24, wherein the solid raw material consists essentially of unground roasted coffee.

26. The method as in claim 24, wherein the unground roasted coffee comprises whole bean coffee.

27. The method as in claim 23, wherein
   in the providing act, the roasted coffee is provided in a surrounding gaseous environment at essentially atmospheric pressure; wherein
   in the supplying a volume of a consumable liquid solvent act, the volume of the consumable liquid solvent is supplied to the roasted coffee in the surrounding gaseous environment at essentially atmospheric pressure, so as to at least partially replace the gaseous environment surrounding the roasted coffee with the consumable liquid solvent, thereby forming a combination of the consumable liquid solvent and the roasted coffee; and wherein
   in the pressurizing act, the combination of the consumable liquid solvent and roasted coffee is pressurized to the selected and controllable pressure level.

28. The method as in claim 23, wherein
   in the providing act, the solid raw material is added to an enclosed container; wherein
   in the supplying a volume of a consumable liquid solvent act, the volume of the consumable liquid solvent is supplied to the enclosed container; wherein
   in the pressurizing act, the enclosed container is pressurized to the selected and controllable pressure level; and wherein
   the establishing act comprises depressurizing the enclosed container from the pressure level by opening an outlet valve on an outlet line of the enclosed container and establishing a flow of the consumable extract from the solid raw material through the outlet line, which flow is driven, at least in part, by the pressure within the enclosed container.

29. The method as in claim 23, wherein
   in the providing act, the roasted coffee is provided in a surrounding gaseous environment at a first pressure; and wherein
   in the supplying a volume of a consumable liquid solvent act, the volume of the consumable liquid solvent is supplied at a pressure substantially different than the first pressure to the roasted coffee.

30. The method as in claim 15, further comprising, after the collecting act, and act of:
   diluting the concentrated coffee extract with water to form a coffee beverage.

31. The method as in claim 1, wherein
   the temperature of the consumable liquid solvent during extraction is between 90 and 212 degrees Fahrenheit.

\* \* \* \* \*